(12) United States Patent
Billings et al.

(10) Patent No.: US 10,980,359 B2
(45) Date of Patent: Apr. 20, 2021

(54) TEMPERATURE-CONTROLLED DISPLAY CASE MAINTENANCE CART SYSTEM

(71) Applicant: Walmart Apollo, LLC, Bentonville, AR (US)

(72) Inventors: Lacrecia Lynn Billings, Rogers, AR (US); Jeremy Mitchell, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 106 days.

(21) Appl. No.: 16/370,994

(22) Filed: Mar. 30, 2019

(65) Prior Publication Data

US 2019/0298084 A1 Oct. 3, 2019

Related U.S. Application Data

(60) Provisional application No. 62/652,130, filed on Apr. 3, 2018.

(51) Int. Cl.
*A47F 3/04* (2006.01)
*F25D 17/08* (2006.01)

(52) U.S. Cl.
CPC .......... *A47F 3/0408* (2013.01); *A47F 3/0426* (2013.01); *F25D 17/08* (2013.01); *F25D 2317/067* (2013.01)

(58) Field of Classification Search
CPC ........ F25B 49/00; F25B 49/005; F25B 49/02; F25B 2400/075; F25B 2400/22;
(Continued)

(56) References Cited

U.S. PATENT DOCUMENTS

| 4,315,414 A | 2/1982 | Ibrahim |
| 6,698,226 B1 | 3/2004 | Mahloch |

(Continued)

FOREIGN PATENT DOCUMENTS

| CN | 203711391 U | 7/2014 |
| CN | 204294541 U | 4/2015 |

(Continued)

OTHER PUBLICATIONS

Young, Lee W., "International Search Report", International Application No. PCT/US2019/025072, dated Jun. 21, 2019, 2 pages.

(Continued)

*Primary Examiner* — Marc E Norman

(57) ABSTRACT

Examples provide a smart maintenance cart for cleaning temperature-controlled display cases. The maintenance cart includes a main body including a set of water tanks, a pump, a vacuum, a set of hoses, a drain hose filter, a set of rollers, a memory, and a processor. A smart maintenance controller analyzes the sensor data using a set of per-case, customized performance thresholds. The smart maintenance controller generates a set of priority rankings for a set of temperature-controlled display cases based on a result of the analysis of the sensor data. The smart maintenance controller identifies a highest priority case in the set of temperature-controlled display cases for maintenance based on the set of priority rankings. The smart maintenance controller outputs a maintenance task notification to a user, the maintenance task notification comprising a case identifier associated with the highest priority case for cleaning.

18 Claims, 20 Drawing Sheets

(58) Field of Classification Search
CPC ............ F25B 2600/07; F25B 2700/195; F25D 29/00; F25D 2400/36; F25D 2700/12; F25D 2700/14; F25D 2700/16; F25D 17/08; G08B 21/00; A23L 3/00; A23L 3/36; A23G 9/00; G05B 15/00; G05B 2219/2642; A47F 3/0408; A47F 3/0426
See application file for complete search history.

(56) References Cited

U.S. PATENT DOCUMENTS

| | | | |
|---|---|---|---|
| 7,051,545 | B2 | 5/2006 | Sauter |
| 8,437,875 | B2 | 5/2013 | Hernandez et al. |
| 2011/0133417 | A1 | 6/2011 | Rouillard et al. |
| 2012/0060529 | A1 | 3/2012 | Singh et al. |
| 2012/0197440 | A1 | 8/2012 | Farkavec et al. |
| 2014/0164153 | A1 | 6/2014 | Koether et al. |
| 2014/0216071 | A1 | 8/2014 | Broadbent |
| 2015/0019065 | A1* | 1/2015 | Bollapragada ............ B64F 5/40 701/29.1 |
| 2017/0258284 | A1 | 9/2017 | Robinson et al. |
| 2018/0211168 | A1* | 7/2018 | Khurshudov .......... G06N 5/025 |

FOREIGN PATENT DOCUMENTS

| | | |
|---|---|---|
| CN | 106670190 A | 5/2017 |
| EP | 3189752 A | 7/2017 |
| WO | 2017004416 A1 | 1/2017 |

OTHER PUBLICATIONS

Young, Lee W., "Written Opinion", International Application No. PCT/US2019/025072, dated Jun. 21, 2019, 7 pages.

* cited by examiner

TEMPERATURE-CONTROLLED DISPLAY CASE MAINTENANCE CART SYSTEM

BACKGROUND

A temperature-controlled display case is a modular display providing a temperature-controlled environment for perishable items, such as dairy items, deli items, frozen foods, etc. A temperature-controlled display case can include a freezer, a refrigerated display case, a cooler, etc. Temperature-controlled display cases frequently include a rack housing multiple condenser and other mechanical parts for maintaining temperature within a threshold temperature range. The condenser coils are typically composed of a metal condenser for heat transfer across the coils. If dust or dirt accumulates on these coils, it prevents proper heat transfer. Therefore, these parts typically require regular cleaning and maintenance to prevent the condenser unit from freezing up or shutting down. Moreover, the coils are delicate and incorrect cleaning can damage the coils. Due to the delicate nature of these parts and the numerous components involved, it is frequently difficult for users to determine when a display case requires cleaning, how frequently to clean, and how to properly clean the condenser. Moreover, current maintenance of these refrigerated display cases is frequently a time consuming, cumbersome, labor intensive, and inefficient process.

SUMMARY

Some examples provide a system for dynamic temperature-controlled display case maintenance. The system includes a set of one or more sensor devices associated with a plurality of temperature-controlled display cases. The sensor device(s) include one or more temperature sensors. A data storage device stores maintenance schedule data associated with the plurality of temperature-controlled display cases. A smart maintenance cart includes a main body housing at least one display case cleaning apparatus, a memory, and at least one processor communicatively coupled to the memory. A communications interface component obtains sensor data from the set of sensor devices via a network. An analysis component identifies at least one display case in the plurality of temperature-controlled display cases having an operation level outside a per-case acceptable threshold operational range based on an analysis of the sensor data. A scheduling component analyzes the maintenance schedule data to identify an elapsed time since a previous maintenance task associated with the at least one display case and trigger an unscheduled maintenance task associated with the at least one display case if the elapsed time is within a threshold time-period. A prioritization component generates a set of priority rankings including a ranking for each case in the plurality of temperature-controlled display cases based on the sensor data and the analysis results. A dynamic scheduling component identifies a highest priority case in the set of temperature-controlled display for cleaning based on the set of priority rankings.

Other examples provide a maintenance cart for cleaning temperature-controlled display cases. The maintenance cart includes a main body. The main body includes a set of water tanks, a pump, a vacuum, a set of hoses, a drain hose filter, and a set of rollers attached to a bottom surface of the main body. A set of sensor devices generates sensor data associated with a set of temperature-controlled display cases. The plurality of sensors includes at least one scanner device. The maintenance cart also includes a memory and at least one processor communicatively coupled to the memory. A smart maintenance controller analyzes the sensor data using a set of per-case performance thresholds. The smart maintenance controller generates a set of priority rankings including a ranking for each display case in the set of temperature-controlled display cases based on the analysis results. The smart maintenance controller identifies a highest priority case in the set of temperature-controlled display cases for maintenance based on the set of priority rankings. The smart maintenance controller outputs a maintenance task notification to a user. The maintenance task notification includes a case identifier associated with the highest priority case for cleaning.

Still other examples provide a computer-implemented method for customizing temperature-controlled display case cleaning via a smart maintenance cart. A smart maintenance cart obtains sensor data from a set of sensor devices associated with a plurality of temperature-controlled display cases via a network. The sensor data including performance data associated with each display case in the plurality of cases. The smart maintenance cart identifies a set of display cases in the plurality of temperature-controlled display cases having a set of performance metric values outside a set of per-case acceptable threshold value ranges based on analysis of the sensor data. The smart maintenance cart generates a priority ranking for each display case in the plurality of temperature-controlled display cases based on the analysis results and a predetermined maintenance schedule for the plurality of temperature-controlled display cases. The smart maintenance cart identifies a highest priority case in the set of temperature-controlled display cases for cleaning based on the set of priority rankings. A transmitter device associated with the smart maintenance cart outputs a maintenance task notification to a user device associated with at least one user. The maintenance task notification includes a case identifier associated with the highest priority case for cleaning.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable a smart maintenance cart. In some examples, the smart maintenance cart analyzes real-time sensor data describing a current state of one or more temperature-controlled display devices to identify display cases having performance levels outside an acceptable threshold range. These display cases are automatically identified for unscheduled maintenance/cleaning based on their dynamic performance data, such as, but not limited to, temperature within the display cases, power utilization, head pressure associated with the condensers, run-time of the condensers, etc. This enables identification of display cases for cleaning based on real-time cooling unit performance, without human intervention for more accurate and timely maintenance task scheduling.

Other examples provide for prioritization of display cases for maintenance based on predetermined maintenance schedules and real-time sensor data associated with the display cases. This enables scheduling of display cases having the poorest performance with higher priority over other display cases to prevent spoilage of perishable items stored within the display cases and reduced rates of failure/freezing up of the temperature-controlled display cases.

The smart maintenance cart in other examples includes a machine learning component that analyzes sensor data, historical maintenance data, repair data, user feedback, and other data to dynamically modify/customize maintenance schedules for the display cases and/or update a set of per-case threshold ranges used to identify display cases for maintenance/cleaning. The smart cleaning cart operates in an unconventional manner by autonomously identifying temperature-controlled display carts for unscheduled maintenance based on real-time performance data and per-case customized maintenance criteria.

Figure 1:
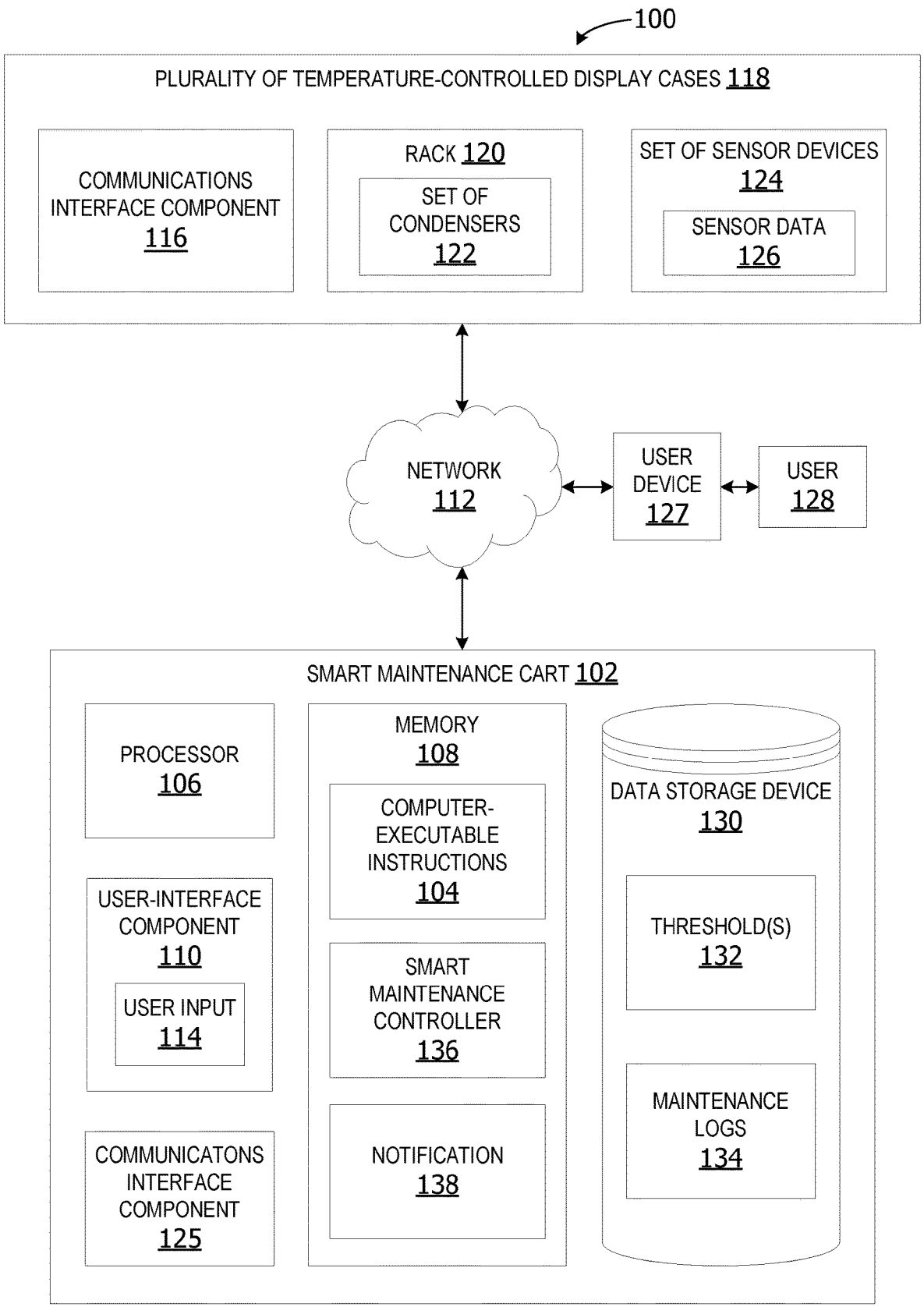
FIG. 1 is an exemplary block diagram illustrating a temperature-controlled display case maintenance system.

Referring again to FIG. 1, an exemplary block diagram illustrates a temperature-controlled display case maintenance system 100. In the example of FIG. 1, the smart maintenance cart 102 is a maintenance/cleaning cart including an integrated computing device executing computer-executable instructions 104 (e.g., as application programs, operating system functionality, or both) to implement the operations and functionality associated with the smart maintenance cart 102. In some examples, the smart maintenance cart 102 has at least one processor 106 and a memory 108. The smart maintenance cart 102 can also include a user interface component 110.

The processor 106 includes any quantity of processing units and is programmed to execute the computer-executable instructions 104. The computer-executable instructions 104 can be performed by the processor 106 or by multiple processors within the smart maintenance cart 102 or performed by a processor external to the smart maintenance cart 102. In some examples, the processor 106 is programmed to execute instructions such as those illustrated in the figures (e.g., FIG. 11, FIG. 12 and FIG. 13).

The smart maintenance cart 102 further has one or more computer-readable media such as the memory 108. The memory 108 includes any quantity of media associated with or accessible by the smart maintenance cart 102. The memory 108 can be internal to the smart maintenance cart 102 (as shown in FIG. 1), external to the smart maintenance cart (not shown), or both (not shown).

The memory 108 stores data, such as one or more applications. The applications, when executed by the processor 106, operate to perform functionality on the smart maintenance cart 102. The applications can communicate with counterpart applications or services such as web services accessible via a network 112.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive user input 114 data from the user: speakers, a sound card, a camera, a microphone, a vibration motor, one or more accelerometers, a BLUETOOTH® brand communication module, global positioning system (GPS) hardware, and a photoreceptive light sensor. For example, the user can input commands or manipulate data by moving the smart maintenance cart 102 in a way.

The network 112 is implemented by one or more physical network components, such as, but without limitation, routers, switches, network interface cards (NICs), and other network devices. The network 112 can be any type of network for enabling communications with remote devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 116. The communications interface component 116 includes a network interface card and/or computer-executable instructions (e.g., a driver)

for operating the network interface card. Communication between the smart maintenance cart 102 and other devices, such as but not limited to the plurality of temperature-controlled display cases 118 and/or the user device 127, can occur using any protocol or mechanism over any wired or wireless connection. In some examples, the communications interface component 116 is operable with short range communication technologies such as by using near-field communication (NFC) tags. In some examples, the communications interface component 116 obtains the sensor data from the set of sensor devices via the network 112.

The plurality of temperature-controlled display cases 118 includes temperature-controlled display cases for storing perishable items or temperature-sensitive items. A temperature-controlled display case can include a refrigerated display case, a freezer display case, or any other display case for cooling items stored within the display case. The plurality of temperature-controlled display cases 118 includes a rack 120 and a set of one or more condensers 122 for controlling an internal temperature of at least one display case in the plurality of temperature-controlled display cases 118.

The plurality of temperature-controlled display cases 118 can include a set of one or more sensor devices 124 generating sensor data 126 associated with the internal temperature of the display cases, the performance of the set of condensers 122, etc. The plurality of temperature-controlled display cases 118 can also include a communications interface component 125 for sending the sensor data 126 to the smart maintenance cart 102 via the network 112.

The user device 127 associated with a user 128 represents any device executing computer-executable instructions. The user device 127 can be implemented as a mobile computing device, such as, but not limited to, a wearable computing device, a mobile telephone, laptop, tablet, computing pad, netbook, gaming device, and/or any other portable device. The user device 127 includes at least one processor and a memory. The user device 127 can also include a user interface component.

The system 100 can optionally include a data storage device 130 for storing data, such as, but not limited to display case performance threshold(s) 132 and/or maintenance logs 134 associated with the plurality of temperature-controlled display cases 118. The data storage device 130 can include one or more different types of data storage devices, such as, for example, one or more rotating disks drives, one or more solid state drives (SSDs), and/or any other type of data storage device. The data storage device 130 in some non-limiting examples includes a redundant array of independent disks (RAID) array. In other examples, the data storage device 130 includes a database.

The data storage device 130 in this example is included within the smart maintenance cart 102 or associated with the smart maintenance cart 102. In other examples, the data storage device 130 is a remote data storage accessed by the smart maintenance cart via the network 112, such as a remote data storage device, a data storage in a remote data center, or a cloud storage.

The memory 108 in some examples stores one or more computer-executable components. Exemplary components include a smart maintenance controller 136. The smart maintenance controller 136 in some examples analyzes the sensor data 126 using a set of per-case performance thresholds 132 customized for each individual temperature-controlled display case based on the contents of each of the display cases. The smart maintenance controller 136 generates a set of priority rankings including a ranking for each display case in the plurality of temperature-controlled display cases 118 based on the analysis results. The smart maintenance controller 136 identifies a highest priority case in the plurality of temperature-controlled display cases 118 for maintenance based on the set of priority rankings. The smart maintenance controller 136 outputs a maintenance task notification 138 to the user 128. The notification 138 includes an identifier identifying the highest priority display case identified for cleaning prior to cleaning the other display cases.

Figure 2:
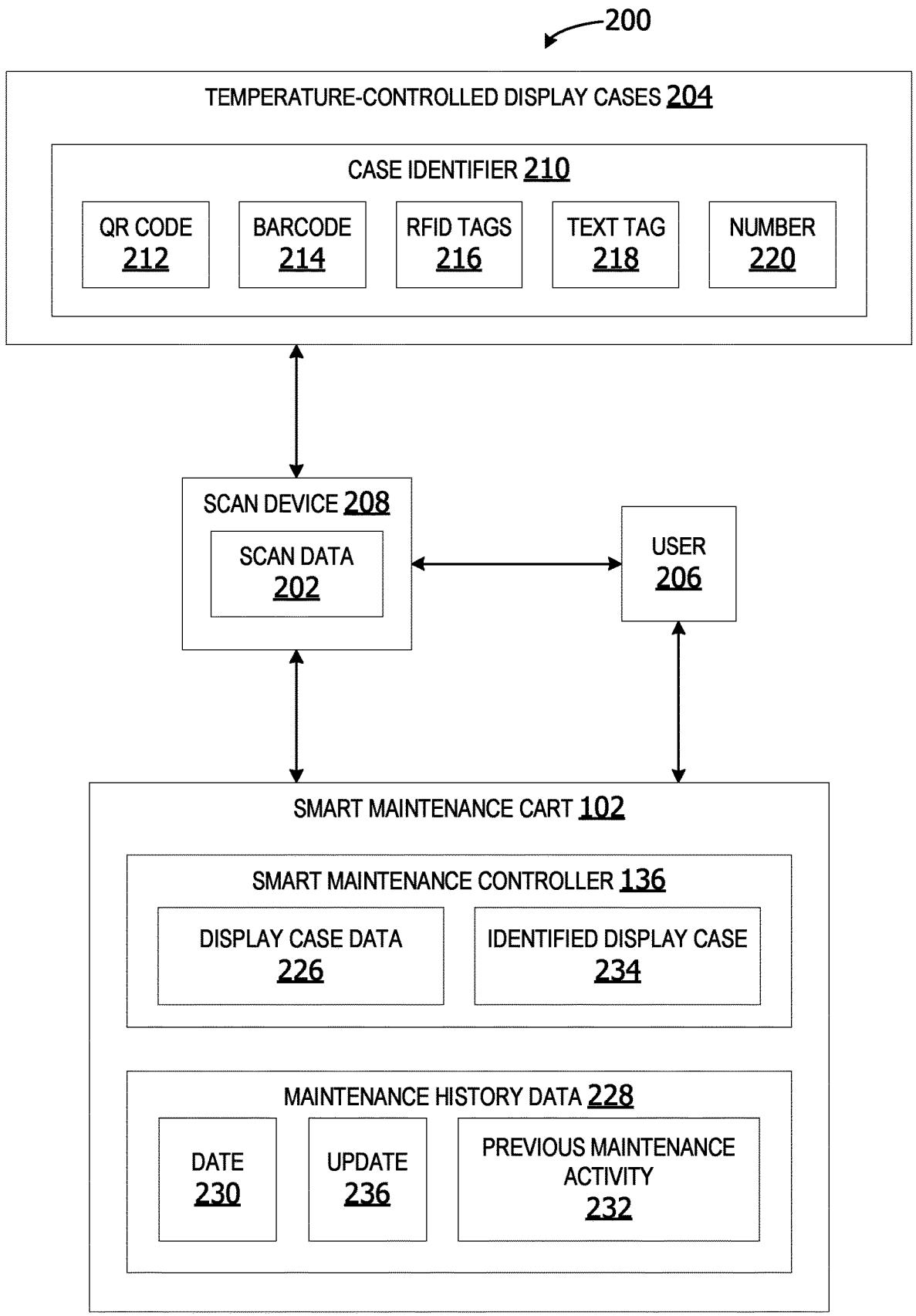
FIG. 2 is an exemplary block diagram illustrating a system for temperature-controlled display case maintenance based on scan data associated with a set of temperature-controlled display cases.

FIG. 2 is an exemplary block diagram illustrating a system 200 for temperature-controlled display case maintenance based on scan data 202 associated with a set of one or more temperature-controlled display cases 204. In some examples, a user 206 utilizes a scan device 208 to scan a case identifier 210 associated with one or more display cases in the set of temperature-controlled display cases 204.

The case identifier 210 can include a quick response (QR) code 212, a barcode 214, a radio frequency identifier (RFID) tag 216, a text tag 218, a number 220 or any other identifier on an outside surface of a display case. The barcode 214 can be a matric barcode, a universal product code (UPC), or any other type of barcode. The scan device 208 generates scan data 202 because of scanning the case identifier 210 on the outside of the display case(s). The scan device 208 sends the scan data 202 to the smart maintenance cart 102.

In this example, the case identifier 210 in FIG. 2 is a QR code 212, a barcode 214, an RFID tag 216, a text tag 218 or a number. In other examples, the case identifier 210 can be implemented as any combination of a QR code 212, a barcode 214, an RFID tag 216, a text tag 218 and/or a number 220. In other words, the case identifier 210 can include both a barcode and an RFID tag. In another example, the case identifier can include both a text tag and a number identifier.

The smart maintenance cart 102 includes a smart maintenance controller 136. The smart maintenance controller 136 analyzes the scan data 202 with display case data 226 and/or maintenance history data 228 associated with the display cases in the set of temperature-controlled display cases 204. The display case data 226 is data associated with a display case 234. The display case data 226 in some examples includes contents of the display case, a maximum temperature threshold, a minimum temperature threshold for the display case, as well as any other data associated with the display case. The contents of the display case include an identification of the items stored/displayed within the display case, a maximum number of items in the display case, a location of the display case, and/or the number of instances of each item in the display case.

The maintenance history data 228 is data recording a history of maintenance/cleaning tasks performed on each display case. The maintenance history data 228 can include a date 230 each maintenance task was performed/completed and/or previous maintenance activity 232. The previous maintenance activity 232 can include an identification of each maintenance task performed. For example, a maintenance task can include cleaning condenser coils, cleaning shelves, cleaning a fan, cleaning a glass door of the display case, etc.

The smart maintenance cart 102 in some examples identifies a display case due for maintenance, such as cleaning, based on a predetermined maintenance schedule. The predetermined maintenance schedule is obtained from the display case data 226 based on the case identifier 210. In other words, the smart maintenance cart 102 can utilize the case identifier 210 to determine whether the display case is already scheduled for cleaning on the current day. If the display case is not scheduled for cleaning, the smart maintenance cart 102 analyzes performance data associated with the display case to determine if the display case requires unscheduled cleaning. When the user provides input to the smart maintenance cart 102 indicating the maintenance/cleaning task on the identified display case is complete, the smart maintenance controller 136 performs an update 236 on the maintenance history data 228. The update 236 provides the date, task ID, and/or other details associated with the completed task.

Figure 3:
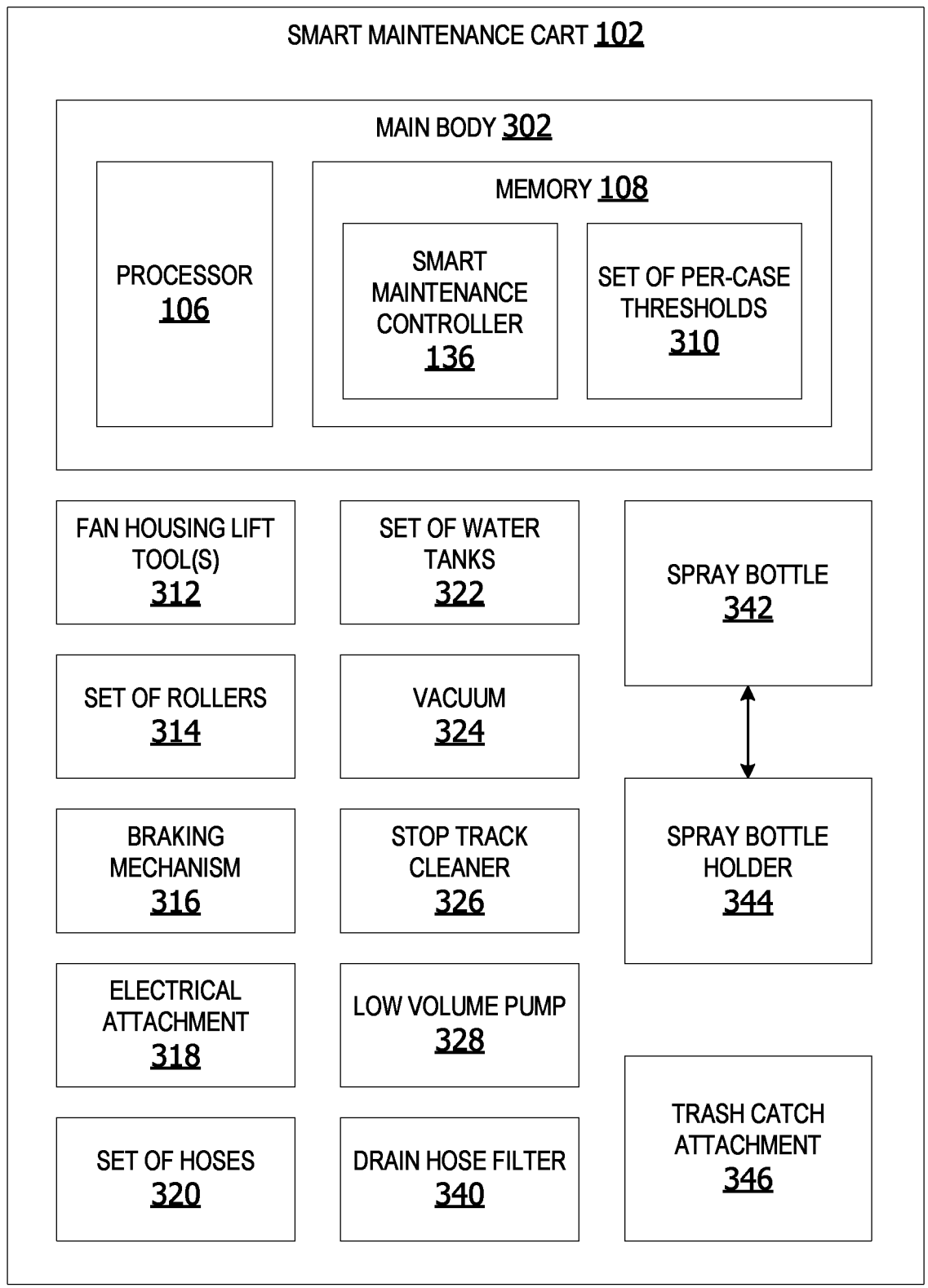
FIG. 3 is an exemplary block diagram illustrating a smart maintenance cart.

FIG. 3 is an exemplary block diagram illustrating a smart maintenance cart 102. The smart maintenance cart 102 includes a main body 302 housing a processor 106 and a memory 108. The memory 108 includes a smart maintenance controller 136 and a set of per-case thresholds 310. The set of per-case thresholds 310 includes performance thresholds customized for each display case.

The smart maintenance cart 102 can also include a set of one or more fan housing lift tools 312 removably attached to the smart maintenance cart 102. The fan housing lift tools 312 are utilized by the user to prop open a fan housing member on a rack within a set of temperature-controlled display cases. The fan housing lift tools 312 in one example includes a set of two sticks or rods having an end configured to hold the fan housing in a raised orientation.

The smart maintenance cart 102 includes a set of rollers 314 connected to a bottom member of the main body 302. In some examples the set of rollers 314 includes a set of four casters or wheels. The set of rollers 314 can optionally include a braking mechanism 316 for preventing the rollers from turning. The braking mechanism can include a locking mechanism, a parking brake, or any other type of braking mechanism.

The set of rollers 314 in this non-limiting example includes a set of wheels and a set of casters. Each wheel in some examples is between five and ten inches in diameter. In one non-limiting example, the set of wheels includes two wheels, where each wheel has a diameter of eight inches.

The set of casters can include between two and six casters. The diameter of each caster in some non-limiting examples is between three inches and eight inches. In one non-limiting example, the set of casters on the cart includes two casters having a diameter of five inches each.

An electrical attachment 318 is a conduit or cord for providing electricity or other power to the smart maintenance cart 102. In some examples, the electrical attachment 318 includes a set of one or more retractable electrical cords. A retractable electrical cord is a cord that automatically retracts into a recess, pocket or other compartment within the main body 302. This permits rapid removal of the electrical cords when the smart maintenance cart 102 is no longer in use or in preparation for storage. In one non-limiting example, the electrical attachment is implemented as a thirty-foot-long electric cord providing electrical power at one-hundred ten volts and eleven amperes. In other non-limiting examples, the electric cord is twenty feet long, twenty-five feet long, thirty-five feet long, or any other length.

The smart maintenance cart 102 includes a set of hoses 320 for moving water or other liquids out of a water tank in the set of water tanks and/or move water or other liquids back into the water tank. In some examples, the set of water tanks 322 include at least one clean water tank for holding clean water to be used for cleaning a display case. The set of water tanks 322 also includes at least one dirty water tank for holding dirty water which is removed/pumped out of the display case during the cleaning process or after cleaning is complete.

In some examples, the set of hoses 320 includes a crushproof vacuum hose connecting a vacuum to the main body via a hose attachment point. The vacuum hose can be any length or width. The set of hoses 320 can also include a water spray line. In one non-limiting example, the vacuum hose and the spray line is fifteen-foot long.

A water tank in the set of water tanks 322 can be any size tank for holding a liquid, such as water. In some examples, the water tank has a size in a range from one gallon to fifty gallons. In one non-limiting example, the water tank is a twenty-gallon water tank. In another example, the water tank is a seventeen-gallon tank.

The smart maintenance cart 102 includes a vacuum 324 for vacuuming dirty water and other debris from the interior portions of the display case during cleaning. The vacuum 324 can include a detachable and extendable hose in the set of hoses 320 capable of attaching to the vacuum 324.

The stop track cleaner 326, in some examples, is removably attached to the smart maintenance cart 102. The stop track cleaner 326 cleans the track in front of the refrigerated case shelving. In one example, the stop track cleaner is a long, narrow brush with cleaning bristles for cleaning a display door/shelf track. The stop track cleaner 326 reduces the need to remove the shelves within the display case during the cleaning process.

The low volume pump 328 pumps clean water through a removably attached hose in the set of hoses 320 onto a condenser within a bottom portion of a display case. If the water pressure is too great, it will damage the condenser coils. The low volume pump 328 is calibrated to pump clean water onto a condenser at a customized flow rate which is strong enough to dislodge dirt from the coils without damaging the coils for safe cleaning. In one non-limiting example, the flow rate of water is a gallon per minute. In another example, the flow rate is 1.2 gallons per minute.

A drain hose filter 340 is a mesh filter or strainer removably attached to an interior portion of the main body 302. The drain hose filter 340 in one example sits inside an end of a drain hose for draining dirty water out of the dirty water tank in the set of tanks 322. The drain hose filter 340 catches debris or other large objects, such as tags, which can clog the drain. The drain hose filter 340 is removably for cleaning the captured debris from the drain hose filter 340.

In one non-limiting example, the drain hose is twenty-five inches long. In another example, the hose is twenty-six inches long.

A spray bottle 342 is a hand-held spray bottle for spraying water or other cleaner onto a surface of the display case. The spray bottle 342 is removably attached to a portion of the stop track cleaner 326. The spray bottle can optionally sit/rest in a spray bottle holder 344. The spray bottle holder 344 is a depression or recess within a portion of the smart maintenance cart 102 adapted to hold a portion of the spray bottle. In one example, the spray bottle holder 344 is a cup holder having a diameter that is equal to or greater than the diameter of the spray bottle 342.

The small trash catch attachment 346 is a removable receptacle for holding debris, towels or other items during cleaning. The trash catch attachment 346 is removable from the smart maintenance cart 102 for emptying.

Figure 4:
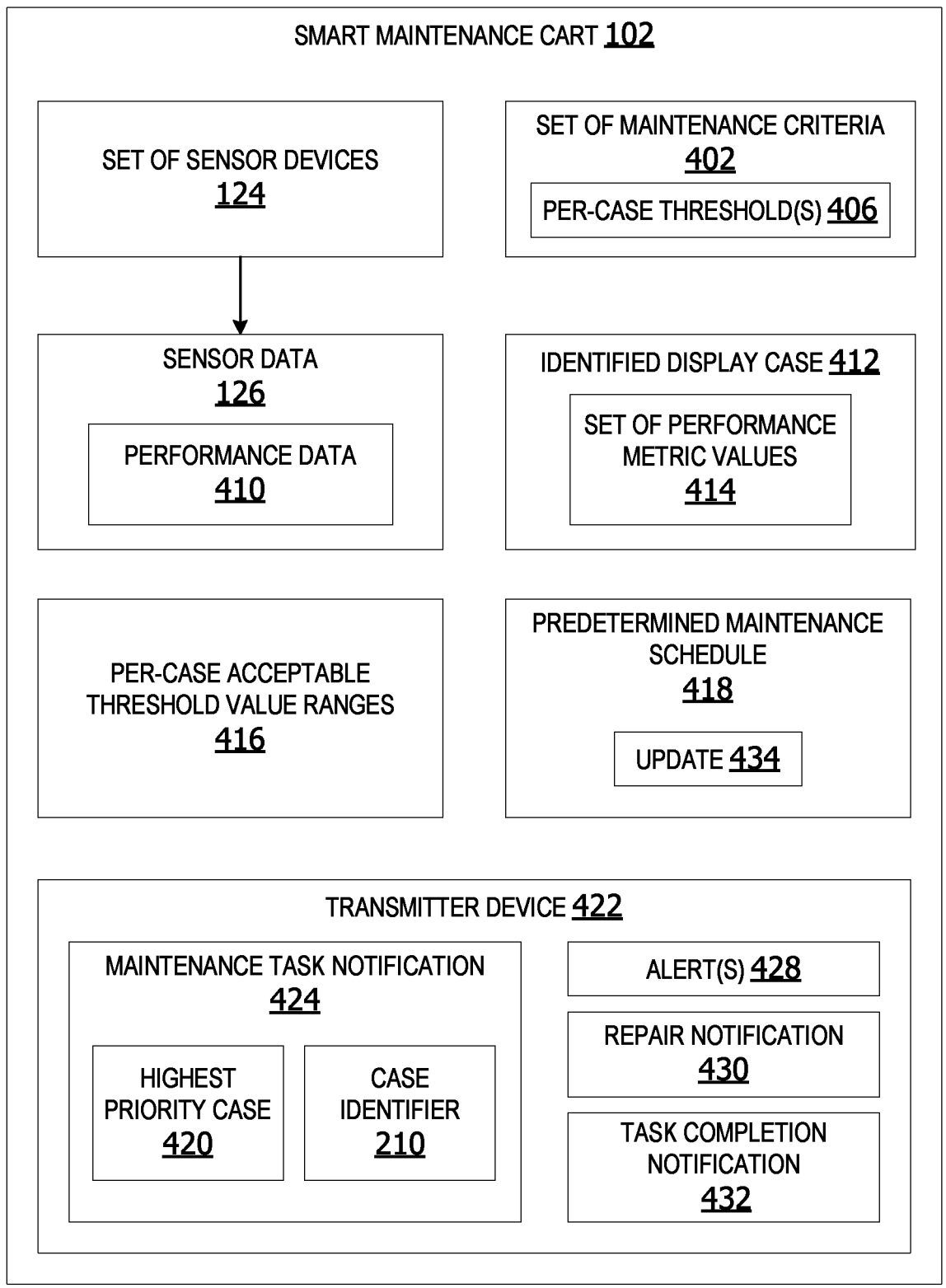
FIG. 4 is an exemplary block diagram illustrating a smart maintenance cart utilizing a set of maintenance criteria to identify display cases for maintenance.

FIG. 4 is an exemplary block diagram illustrating a smart maintenance cart 102 utilizing a set of maintenance criteria 402 to identify display cases for maintenance. The smart maintenance cart 102 in this example includes a set of one or more sensor devices 124 associated with one or more temperature-controlled display cases. The set of sensor devices 124 can include scan devices for reading user identifier (ID) cards, display case IDs, or any other type of identifier. The set of sensor devices 124 can also include one or more temperature sensors for taking temperature readings inside a display case.

The set of maintenance criteria 402 includes a set of one or more per-case threshold(s) 406. For example, if the set of maintenance criteria 402 includes a maximum temperature threshold for cold-chain items, a first display case storing milk have a maximum temperature threshold value of thirty-eight degrees Fahrenheit and a second display case storing ice cream can have a maximum temperature threshold value of zero degrees Fahrenheit. Thus, the maintenance and the threshold for each display case are customized to that temperature-controlled display case based on the contents of the display case.

In some examples, the smart maintenance cart 102 obtains sensor data 126 from a set of sensor devices associated with a plurality of temperature-controlled display cases via a network. The sensor data including performance data 410 associated with each display case in the plurality of cases. The smart maintenance cart 102 identifies a display case 412 having a set of performance metric values 414 outside a set of per-case acceptable threshold value ranges 416 based on analysis of the sensor data. The smart maintenance cart 102 generates a priority ranking for each display case in the plurality of temperature-controlled display cases based on the analysis results and a predetermined maintenance schedule 418 for the plurality of temperature-controlled display cases.

The smart maintenance cart identifies a highest priority case 420 in the set of temperature-controlled display cases for cleaning based on the set of priority rankings. A transmitter device 422 outputs a maintenance task notification 424 to a user. The notification can be output via a user interface component on the smart maintenance cart 102. In other examples, the notification is transmitted to a user device associated with the user via a network connection. The maintenance task notification 424 includes a case identifier 210 identifying the highest priority case for cleaning.

In other examples, the smart maintenance cart outputs one or more alert(s) 428. The alert(s) can notify the user that the smart maintenance cart is within a vicinity of a temperature-controlled display case scheduled to be cleaned, the smart maintenance cart is within the vicinity of a display case that is experiencing a performance problem/maintenance issue, etc. The smart maintenance cart, in other examples, can output a repair notification 430 to a user identifying a display case that may require repair.

The smart maintenance cart can also output task completion notification 432 to one or more users and/or to one or more remote computing device when a scheduled or assigned maintenance task is completed. When the task is completed, the smart maintenance cart performs an update 434 of the maintenance history for the refrigerated display case.

Figure 5:
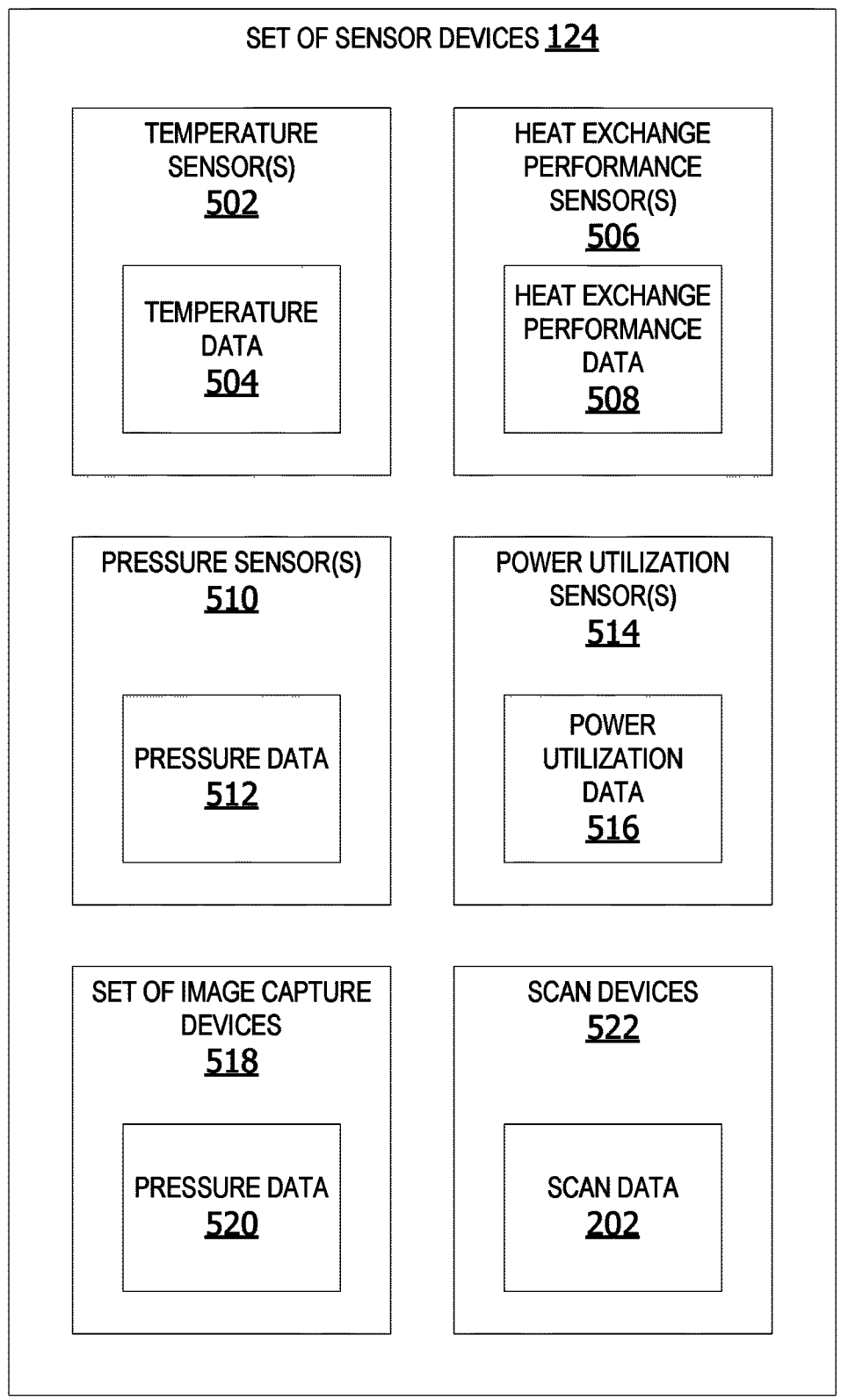
FIG. 5 is an exemplary block diagram illustrating a set of sensor devices for capturing sensor data associated with temperature-controlled display cases.

FIG. 5 is an exemplary block diagram illustrating a set of sensor devices 124 for capturing sensor data associated with one or more temperature-controlled display cases. The set of sensor devices 124 can include one or more temperature sensor(s) 502 generating temperature data 504 associated with an internal temperature of one or more of the temperature-controlled display cases.

The set of sensor devices 124 can include one or more heat exchange performance sensor(s) 506 generating heat exchange performance data 508 associated with the performance of one or more condensers associated with one or more of the temperature-controlled display cases. The heat exchange performance data 508 indicates the rate of cooling or efficiency of heat exchange by the condensers (heat exchange device) associated with the display case(s).

The set of sensor devices 124 optionally includes one or more pressure sensor(s) 510 generating pressure data 512 associated with addition or removal of items on one or more shelves inside one or more of one or more of the temperature-controlled display cases. The set of sensor devices 124 can also optionally include one or more power utilization sensor(s) 514 generating power utilization data 516 indicating an amount of electricity or other power utilized by the refrigerator/cooling unit(s) associated with one or more of the temperature-controlled display cases.

The set of sensor devices 124 can include a set of image capture devices 518 generating image data 520 associated with one or more portions of one or more of the temperature-controlled display cases. In some examples, the image data 520 includes images of the condensers prior to cleaning/performing maintenance and images of the condensers after cleaning is complete. In still other examples, the system analyzes images of the display case after cleaning is complete to determine whether the display case has been restored to its proper state. In other words, the image data 520 can be analyzed using image recognition analytics to determine if shelves have been replaced inside the display case properly, the correct items have been stocked inside the display case, the condenser has been cleaned and re-assembled properly, the fan housing member has been returned to its proper position following cleaning, etc.

The set of sensor devices 124 can also include one or more scan device(s) 522 generating scan data 202 associated with an identifier on a display case, an aisle marker, a user ID badge, etc. The scan device(s) 522 can include hand-held scanners or scan devices mounted onto the smart maintenance cart.

Figure 6:
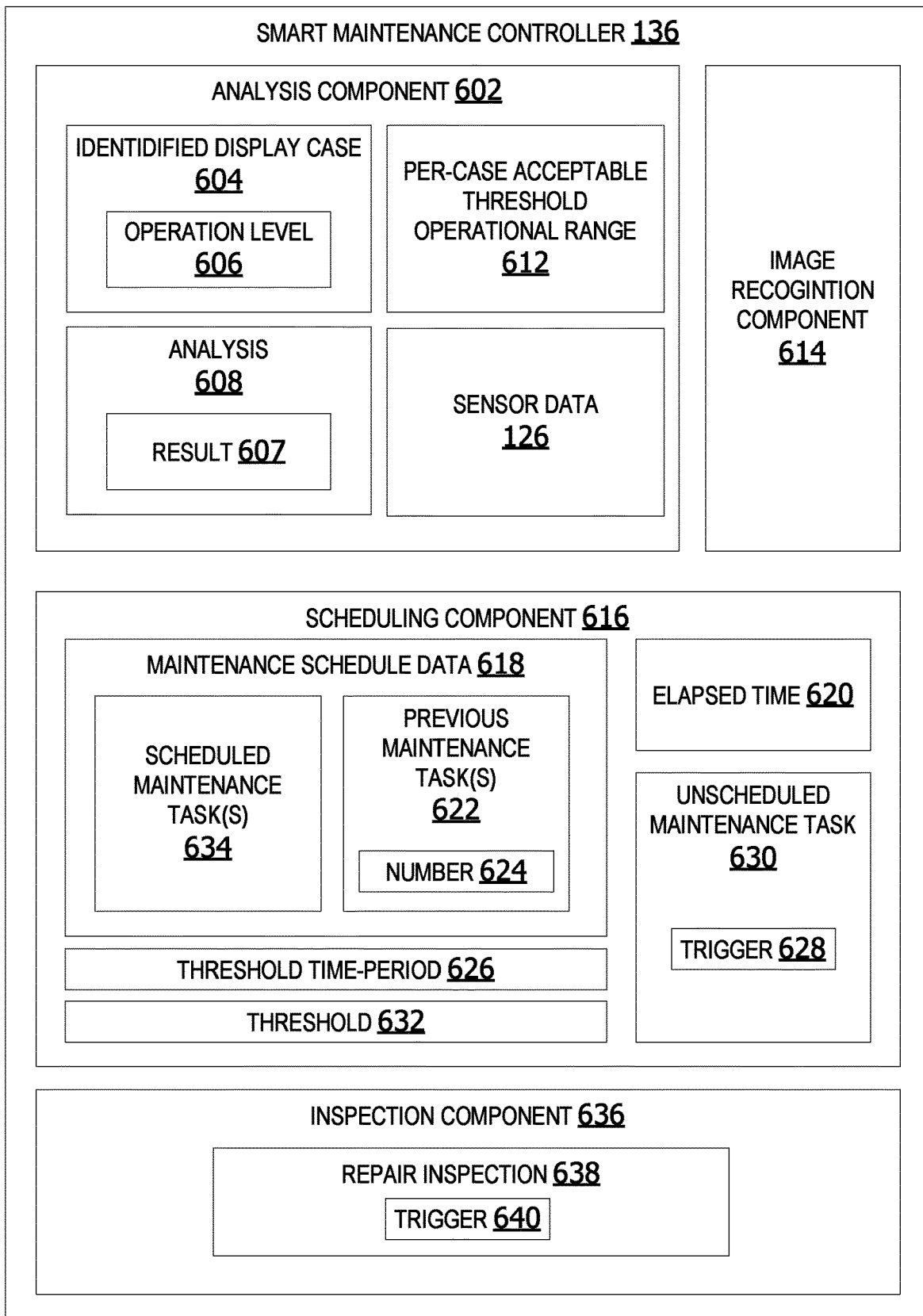
FIG. 6 is an exemplary block diagram illustrating a smart maintenance controller.

FIG. 6 is an exemplary block diagram illustrating a smart maintenance controller 136. The smart maintenance controller 136 in some examples includes an analysis component 602 identifies a display case 604 from a plurality of temperature-controlled display cases that has an operation level 606 outside a per-case acceptable threshold operational range 612 based on a result 607 of an analysis 608 of the sensor data 126. The operational level 606 refers to the operational status of the display case. For example, if the cooling unit in the identified display case is running seventy-five percent of the time but it is only supposed to be running fifty-percent of the item, the identified display case 604 is running at an operation level that is below the per-case acceptable threshold operational range 612 for that display case.

The analysis component 602 identifies a display case in the plurality of temperature-controlled display cases that has a heat exchange performance value outside a per-case acceptable performance threshold range based on an analysis of the sensor data, including heat exchange performance data, obtained from the set of sensor devices. The heat exchange performance value is a value indicating rate, quality, degree or efficiency of heat exchange.

In some examples, the analysis component 602 identifies a display case in the plurality of temperature-controlled display cases having a head pressure outside a per-case acceptable pressure threshold range based on an analysis of the sensor data, including head pressure data, obtained from a plurality of sensor devices or a set of sensor devices.

The analysis component 602 in other examples identifies a display case in the plurality of temperature-controlled display cases having a power utilization outside a per-case acceptable power draw threshold range based on an analysis of the sensor data, including power utilization data, obtained from the set of sensor devices.

In other examples, an image recognition component 614 analyzes sensor data 126, including image data, using item recognition analytics to identify a state/condition of a display case and/or verify a maintenance task is completed properly/successfully. The image data in these examples includes images of portions of the rack, condensers, fan housing, or other components of the temperature-controlled display case. In other words, the image recognition component 614 analyzes image data associated with at least a portion of the at least one display case generated by the set of image capture devices to verify a completed maintenance task.

A scheduling component 616 in other examples analyzes maintenance schedule data 618 to identify an elapsed time 620 since completion of one or more previous maintenance task(s) 622 associated with the at least one display case. The previous maintenance task(s) 622 include previous cleanings of identified display case 604. The previous maintenance task(s) 622 can include a number 624 of times an identified display case has been cleaned within a threshold item-period 626. The scheduling component 616 generates a trigger 628 of an unscheduled maintenance task 630 associated with identified display case 604 of the elapsed time 620 is within a threshold 632 amount of time and there are no current scheduled maintenance task(s) 634 associated with the identified display case 604 already scheduled to occur.

An inspection component 636 generates a trigger 640 of a repair inspection 638 for the identified display case 604 if the elapsed times 620 exceeds the threshold 632 amount of time.

Figure 7:
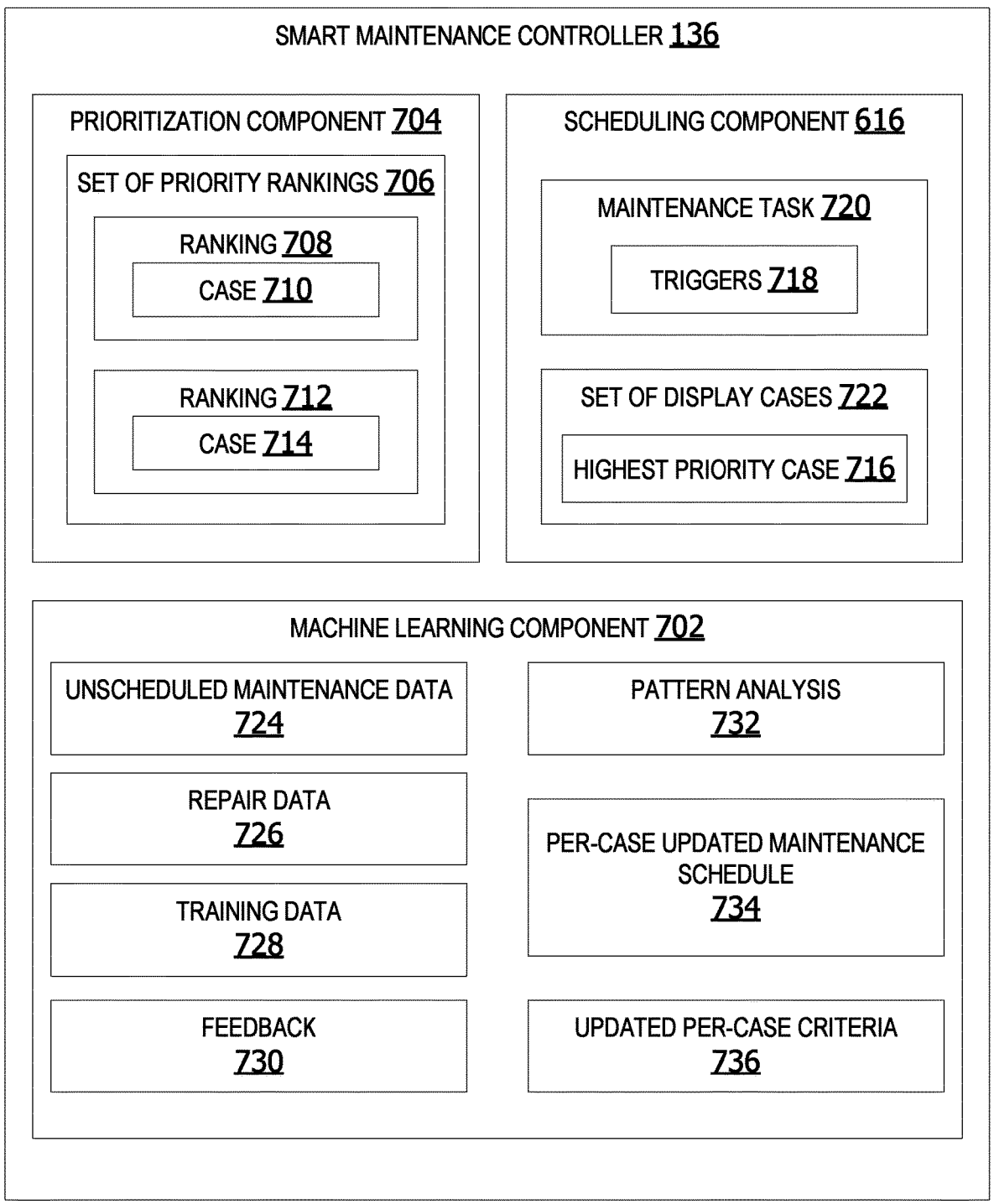
FIG. 7 is an exemplary block diagram illustrating a smart maintenance controller including a machine learning component.

FIG. 7 is an exemplary block diagram illustrating a smart maintenance controller 136 including a machine learning component 702. In some examples, a prioritization component 704 generates a set of priority rankings 706, including a ranking 708 for each case 710 in a set of display cases 722. The set of display cases 722 is a set of one or more cases, such as, but not limited to, the cases in the plurality of temperature-controlled display cases 118 in FIG. 1.

The ranking 708 for each case is generated based on the sensor data and the analysis results. The ranking is a score or rank indicating a relative priority of cleaning each display cart relative to other display carts to be cleaned. The ranking can be represented using any type of number, letter, alphanumeric, symbol, percentage value, or any other type of rank value.

For example, a first display case 710 can have a ranking 708 of nine on a scale of one to ten while a second display case 714 has a ranking 712 of eight. In this example, the first case 710 is a highest priority case 716 when compared to the second case 714.

A dynamic scheduling component 616 identifies the highest priority case 716 in the set of display cases 722 for cleaning based on the set of priority rankings 706. The scheduling component 616 in some examples dynamically triggers 718 an unscheduled maintenance task 720 for the highest priority case 716 in real-time. The highest priority display case is cleaned before the second highest priority display case.

A machine learning component 702 in other examples analyzes unscheduled maintenance data 724, repair data 726 associated with the plurality of temperature-controlled display cases, training data 728, and/or user-provided feedback 730 using pattern analysis 732. The machine learning component 702 generates a per-case updated maintenance schedule 734 for an identified display case based on the results of the analysis. In other examples, the machine learning component 702 generates updated per-case criteria 736, including updated per-case acceptable threshold performance values, based on the results of the machine learning analysis.

Figure 8:
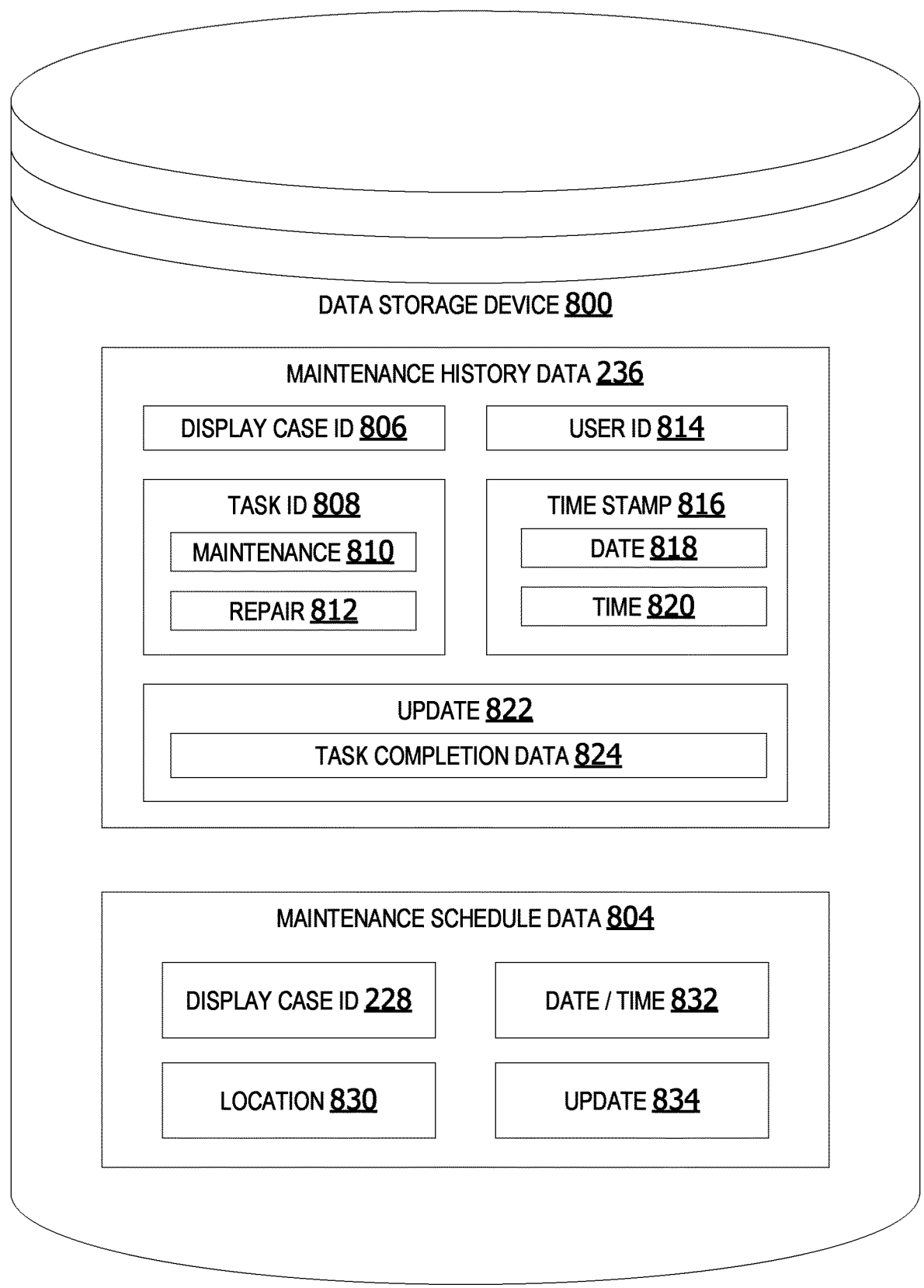
FIG. 8 is an exemplary block diagram illustrating a data storage device.

FIG. 8 is an exemplary block diagram illustrating a data storage device 800. The data storage device 800 stores maintenance-related data associated with maintaining and/or cleaning refrigerated display cases. In this example, the data storage device 800 stores maintenance history data 228 and/or maintenance schedule data 804 associated with one or more temperature-controlled display cases.

The maintenance history data 228 can include a display case ID 806 identifying a selected temperature-controlled display case, a task ID 808 identifying whether a task is a maintenance 810 task or a repair task 812, as well as a user ID 814 identifying a user that operated the smart cleaning cart and/or performed the cleaning task. The maintenance history data 228 can also include a timestamp 816 identifying a date 818 and/or time 820 when the maintenance task was performed/completed. Each time the smart cleaning cart is utilized to perform a maintenance task, the smart maintenance cart automatically performs an update 236 on the maintenance history data 228. The update 822 adds task completion data 824 associated with the newly completed maintenance task to the maintenance history data 228.

The maintenance schedule data 804 includes scheduled to be performed on one or more temperature-controlled display cases on a future date and/or a future time. In some examples, the maintenance schedule data 804 includes a next scheduled maintenance task on an identified display case. The maintenance schedule data 804 can optionally include the display case ID 828 for the identified display case, the location 830 of the identified display case, and/or the date/time 832 when the next scheduled maintenance task is scheduled to occur. If the maintenance schedule is changed by a user or by the machine learning component, the smart maintenance controller performs an update 834 of the maintenance schedule data 804 to reflect those changes.

Figure 9:
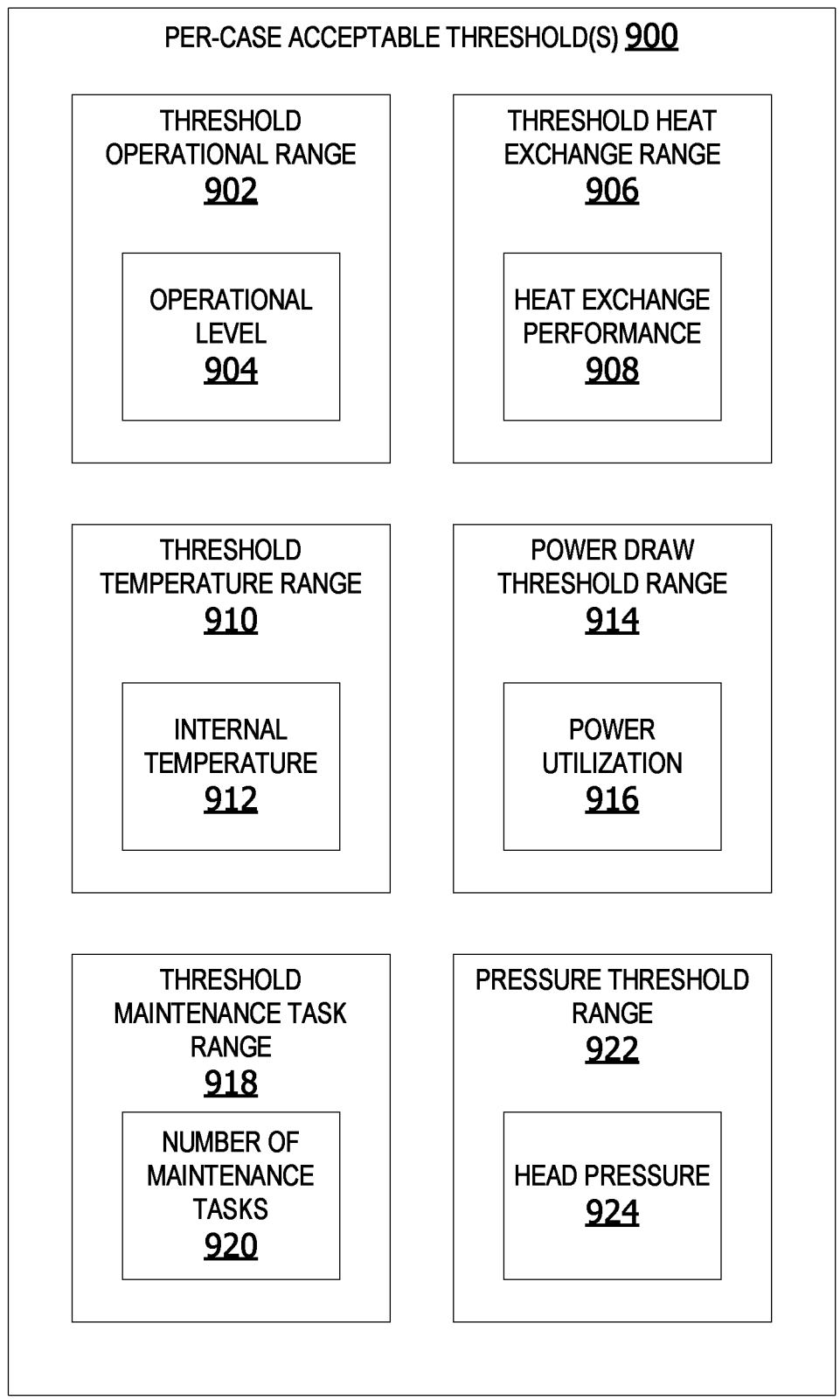
FIG. 9 is an exemplary block diagram illustrating per-case acceptable threshold(s).

FIG. 9 is an exemplary block diagram illustrating per-case acceptable threshold(s) 900. The threshold(s) 900 can include a threshold operational range 902 specifying a minimum threshold operational level 904 for a given refrigerated display case. A threshold heat exchange range 906 includes a minimum and/or a maximum threshold value for heat exchange performance 908 associated with one or more condensers in a set of display cases.

The threshold(s) 900 in other examples include a threshold temperature range 910 specifying a maximum threshold internal temperature 912. If the internal temperature exceeds the threshold temperature, the contents of the display case can become unsuitable for use/consumption.

A power draw threshold range 914 specifies a minimum and/or maximum power utilization 916 for an identified display case. If the power utilization falls outside the threshold range, the system identifies that display case as a case requiring maintenance and/or repair.

The threshold(s) 900 can also include a threshold maintenance task range 918. If the number of maintenance tasks 920 performed on an identified display case during a predetermined time-period exceeds the threshold, the identified display case is flagged for a repair inspection due to possible mechanical problems. This occurs if the condensers are being cleaned too frequently due to recurring performance problems. In this case, the rate of unscheduled cleanings is utilized by the smart maintenance controller to identify a display case which can be suffering performance problems which are not being corrected by cleaning.

A pressure threshold range 922 is a set of threshold values for head pressure 924 on the pump. If the pressure falls outside the acceptable threshold range, either too high or too low, the system flags the display case for maintenance and/or repair.

Figure 10:
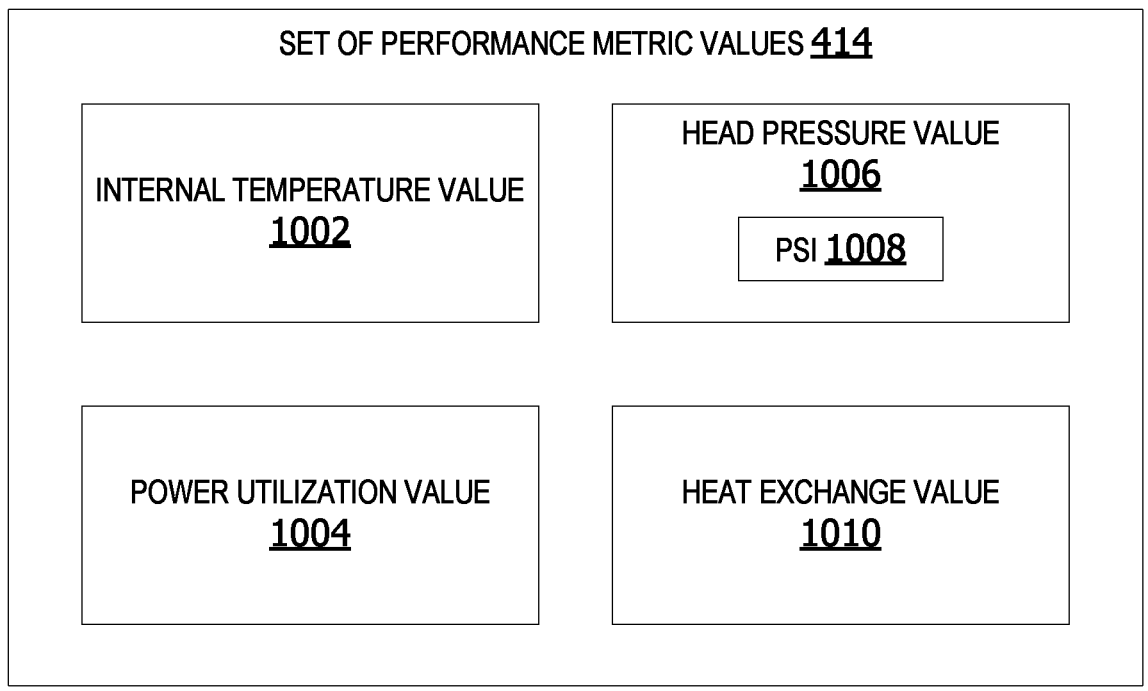
FIG. 10 is an exemplary block diagram illustrating a set of performance metric values.

FIG. 10 is an exemplary block diagram illustrating a set of performance metric values 414 for measuring performance of a refrigerated display case. The values in the set of performance metric values 414 can include, without limitation, an internal temperature value 1002, a power utilization value 1004 for the display case, a head pressure value 1006 identifying pump head pressure pounds per square inch (PSI) 1008, and/or a heat exchange value 1010 for one or more condensers.

Figure 11:
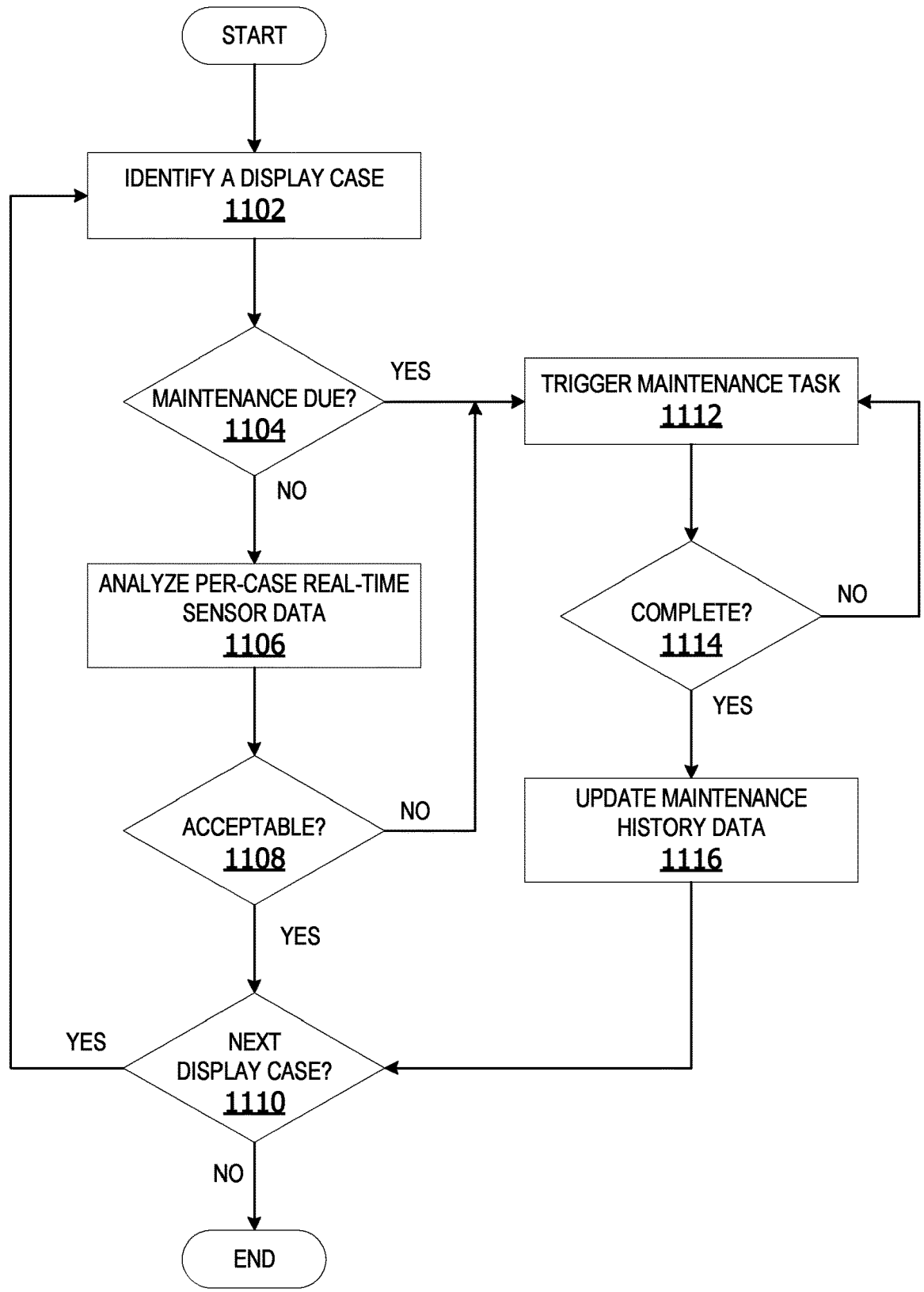
FIG. 11 is an exemplary flow chart illustrating operation of the smart maintenance cart to trigger a maintenance task associated with a display case.

FIG. 11 is an exemplary flow chart illustrating operation of the smart maintenance cart to trigger a maintenance task associated with a display case. The process shown in FIG. 11 can be performed by a smart maintenance controller, executing on a smart maintenance cart device, such as the smart maintenance cart 102 in FIG. 1, FIG. 2, FIG. 3 and/or FIG. 4.

The process begins by identifying a display case at 1102. The display case is a temperature-controlled display case, such as, but not limited to, a case in the plurality of temperature-controlled display cases 118 in FIG. 1 or the set of temperature-controlled display cases 204 in FIG. 2. The smart maintenance controller determines if maintenance is due at 1104. Maintenance is due if a maintenance or cleaning task is scheduled for the display case. If no, the smart maintenance controller analyzes per-case real-time sensor data at 1106. The sensor data is data associated with the performance of the display case, such as, but not limited to, the sensor data 126 in FIG. 1.

The smart maintenance controller determines if the performance of the display case is acceptable at 1108. The performance is acceptable if the sensor data indicates the performance metric data for the display case is within threshold ranges for the display case. If it is acceptable, the smart maintenance controller determines if there is a next display case to be checked at 1110. If no, the process terminates thereafter.

Returning to 1104, if maintenance on the display case is due, the smart maintenance controller triggers the maintenance task at 1112. The smart maintenance controller determines if the task is complete at 1114. The determination can be made based on user input indicating the task is complete or based on analysis of image data of the display case showing the cleaning task is complete. If yes, the smart maintenance controller updates the maintenance history data at 1116. The maintenance history data is data associated with maintenance performed on a display case in the past, such as, but not limited to, the maintenance history data 228 in FIG. 2 and/or FIG. 8. The smart maintenance controller determines if there is a next display case to be checked. If no, the process terminates thereafter.

If the analysis of the per-case real-time sensor data indicates the performance of the display case is unacceptable at 1108, the smart maintenance controller triggers the maintenance task at 1112. The smart maintenance controller determines if the task is complete at 1114. The determination can be made based on user input indicating the task is complete or based on analysis of image data of the display case showing the cleaning task is complete. If yes, the smart maintenance controller updates the maintenance history data at 1116. The smart maintenance controller determines if there is a next display case to be checked. If no, the process terminates thereafter.

While the operations illustrated in FIG. 11 are performed by a computing device, aspects of the disclosure contemplate performance of the operations by other entities. For example, a cloud service can perform one or more of the operations.

Figure 12:
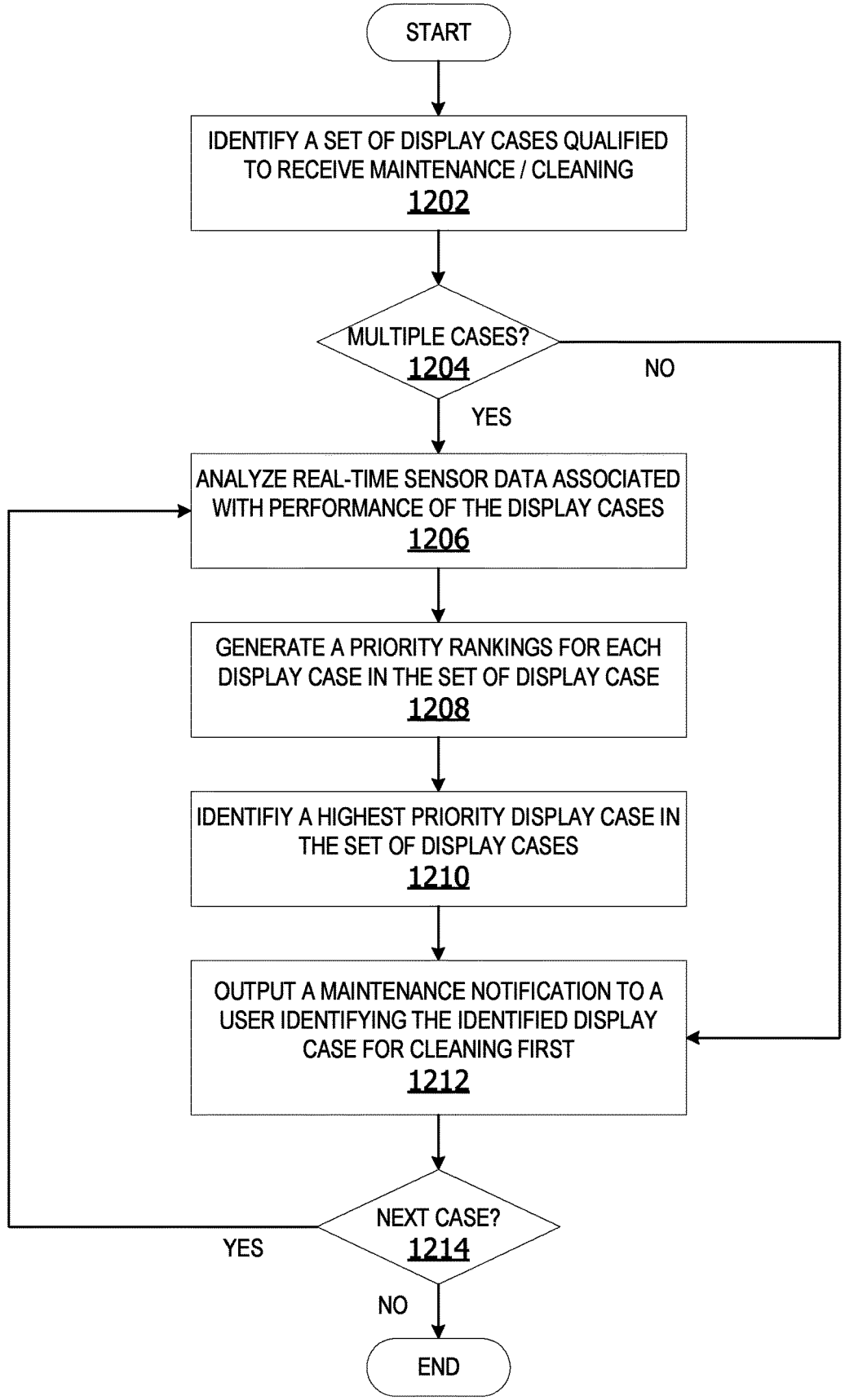
FIG. 12 is an exemplary flow chart illustrating operation of the smart maintenance cart to output a maintenance notification to a user.

FIG. 12 is an exemplary flow chart illustrating operation of the smart maintenance cart to output a maintenance notification to a user. The process shown in FIG. 12 can be performed by a smart maintenance controller, executing on a smart maintenance cart device, such as the smart maintenance cart 102 in FIG. 1, FIG. 2, FIG. 3 and/or FIG. 4.

The process begins by identifying a set of display cases qualified to receive maintenance/cleaning at 1202. A case is qualified if it is scheduled for a maintenance task or if sensor data indicates the performance of the display case is outside an acceptable performance threshold range. The smart maintenance controller determines if there are multiple display cases qualified for maintenance/cleaning at 1204. If yes, the smart maintenance controller analyzes real-time sensor data associated with performance of the display cases at 1206. The smart maintenance controller generates priority rankings for each display case in the set of display case at 1208. The smart maintenance controller identifies a highest priority display case in the set of display case at 1210. The smart maintenance controller outputs a maintenance notification to a user identifying the identified display case for cleaning first at 1212. The smart maintenance controller determines if there is a next display case at 1214. If yes, the smart maintenance controller iteratively executes steps 1206 through 1214 until there are no additional display cases to be checked. The process terminates thereafter.

Returning to 1204, if there is only a single display case qualified to received maintenance/cleaning, the smart maintenance controller outputs a maintenance notification to a user identifying the identified display case for cleaning first at 1212. The smart maintenance controller determines if there is a next display case at 1214. If no, the process terminates thereafter.

While the operations illustrated in FIG. 12 are performed by a computing device, aspects of the disclosure contemplate performance of the operations by other entities. For example, a cloud service can perform one or more of the operations.

Figure 13:
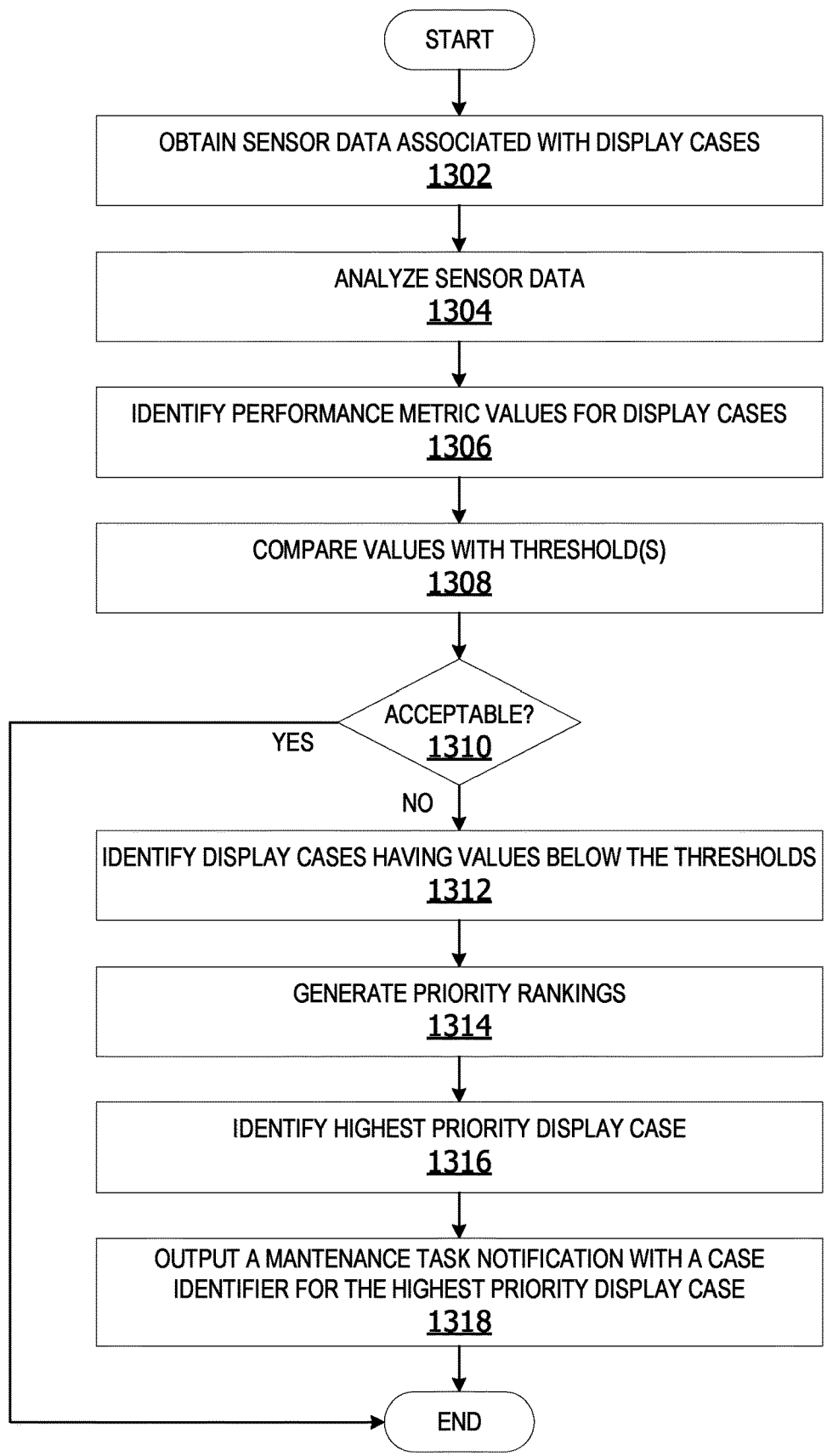
FIG. 13 is an exemplary flow chart illustrating operation of the smart maintenance cart to identify display cases for maintenance based on performance metric values for the display cases.

FIG. 13 is an exemplary flow chart illustrating operation of the smart maintenance cart to identify display cases for maintenance based on performance metric values for the display cases. The process shown in FIG. 13 can be performed by a smart maintenance controller, executing on a smart maintenance cart device, such as the smart maintenance cart 102 in FIG. 1, FIG. 2, FIG. 3 and/or FIG. 4.

The process begins by obtaining sensor data associated with display cases at 1302. The smart maintenance controller analyzes the sensor data at 1304. The smart maintenance controller identifies performance metric values for the display cases at 1306. The performance metric values are values, such as, but not limited to, the values in the set of performance metric values 414 in FIG. 4 and FIG. 10.

The smart maintenance controller compares the performance metric values with threshold(s) at 1308. The smart maintenance controller determines if the performance metric values are acceptable based on the threshold(s) at 1310. If yes, the process terminates thereafter.

If the performance of the one or more display cases is unacceptable at 1310, the smart maintenance controller identifies display cases having values below the thresholds at 1312. The smart maintenance controller generates priority rankings for the display cases at 1314. The smart maintenance controller identifies a highest priority display case at 1316. The smart maintenance controller outputs a maintenance task notification with a case identifier identifying the highest priority display case at 1318. The process terminates thereafter.

While the operations illustrated in FIG. 13 are performed by a computing device, aspects of the disclosure contemplate performance of the operations by other entities. For example, a cloud service can perform one or more of the operations.

Figure 14:
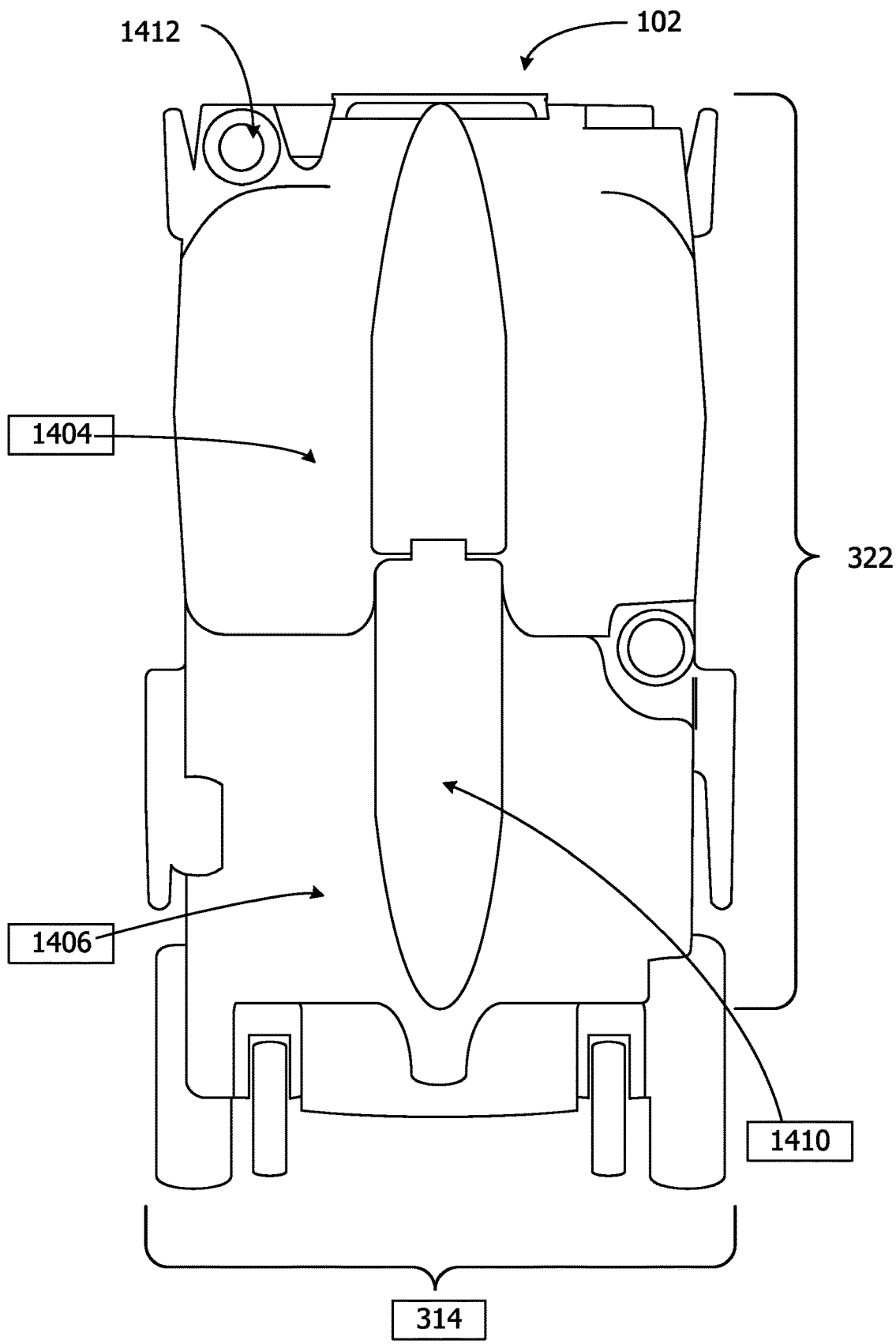
FIG. 14 is an exemplary front view of the smart maintenance cart.

FIG. 14 is an exemplary front view of the smart maintenance cart 102. The smart maintenance cart 102 includes a set of water tanks 322. The set of water tanks 322 in this example includes a dirty water tank 1404 and a clean water tank 1406. In other examples, the tank 1404 is a clean water tank and the tank 1406 is a dirty water tank.

The smart maintenance cart 102 in one non-limiting example includes a set of rollers 314 and a hose spool 1410 for wrapping a set of hoses around. In other examples, an electrical attachment 318 is wrapped around the hose spool 1410.

The smart maintenance cart 102 includes one or more hose attachments, such as the hose attachment 1412 for connecting hoses to the set of water tanks 322. The hose attachments are utilized to add liquid, such as water, to the set of water tanks 322 or remove liquid from the set of water tanks 322.

The smart maintenance cart 102 in some non-limiting examples has a height between thirty and fifty inches, a length between fifteen and forty inches, and a width between twelve and thirty-two inches. In one non-limiting example, the cart has a height of forty-two inches tall, a length of thirty inches and a width of twenty-four inches. In another example, the cart has a height of forty inches, a length of twenty-eight inches, and a width of twenty-two inches. In still another example, the cart has a height of thirty-eight inches, a length of twenty-six inches, and a width of twenty inches.

Figure 15:
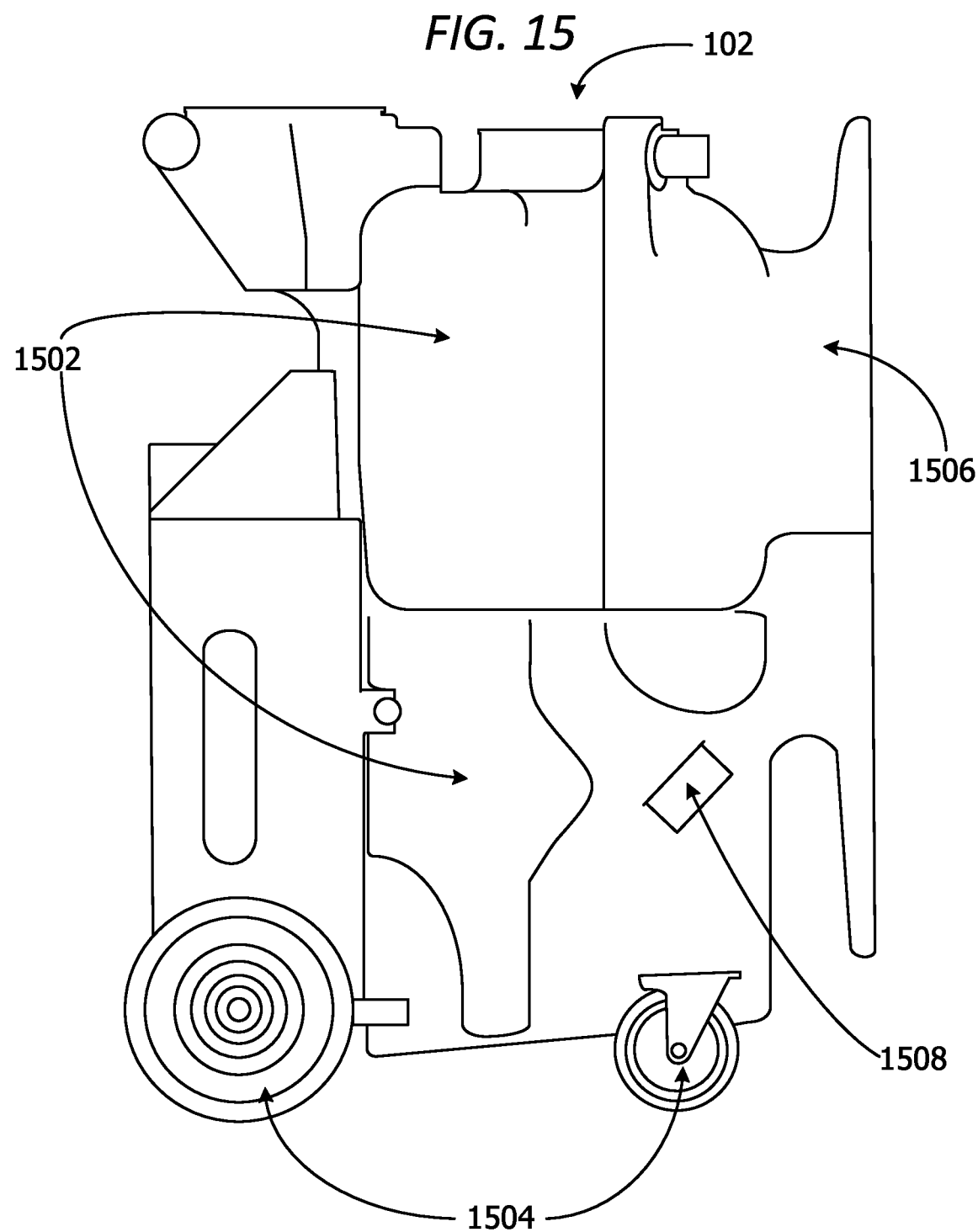
FIG. 15 is an exemplary side view of a first side of the smart maintenance cart.

FIG. 15 is an exemplary side view of a first side of the smart maintenance cart 102. The smart maintenance cart 102 in this non-limiting example includes one or more water tanks 1502, one or more rollers 1504, a hose spool 1506, and one or more hose attachment points, such as the hose attachment 1508. The smart maintenance cart 102 in some examples has a weight between fifty and two hundred pounds. In one non-limiting example, the cart has a weight of one-hundred pounds. In another example, the cart has a weight of one-hundred twenty pounds.

Figure 16:
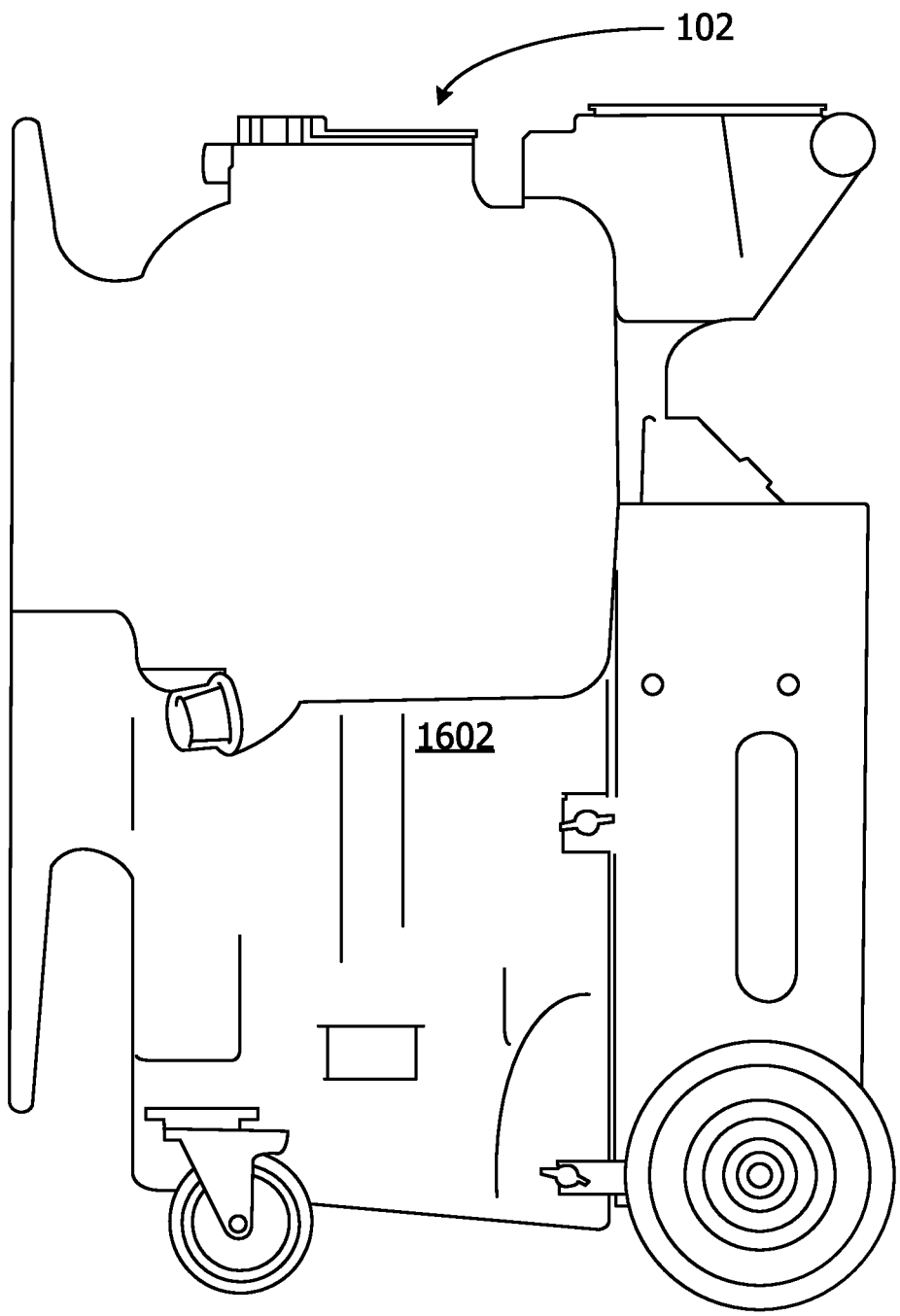
FIG. 16 is an exemplary side view of a second side of the smart maintenance cart.

FIG. 16 is an exemplary side view of a second side of the smart maintenance cart 102. The smart maintenance cart 102 in this non-limiting example includes at least one water tank 1602.

Figure 17:
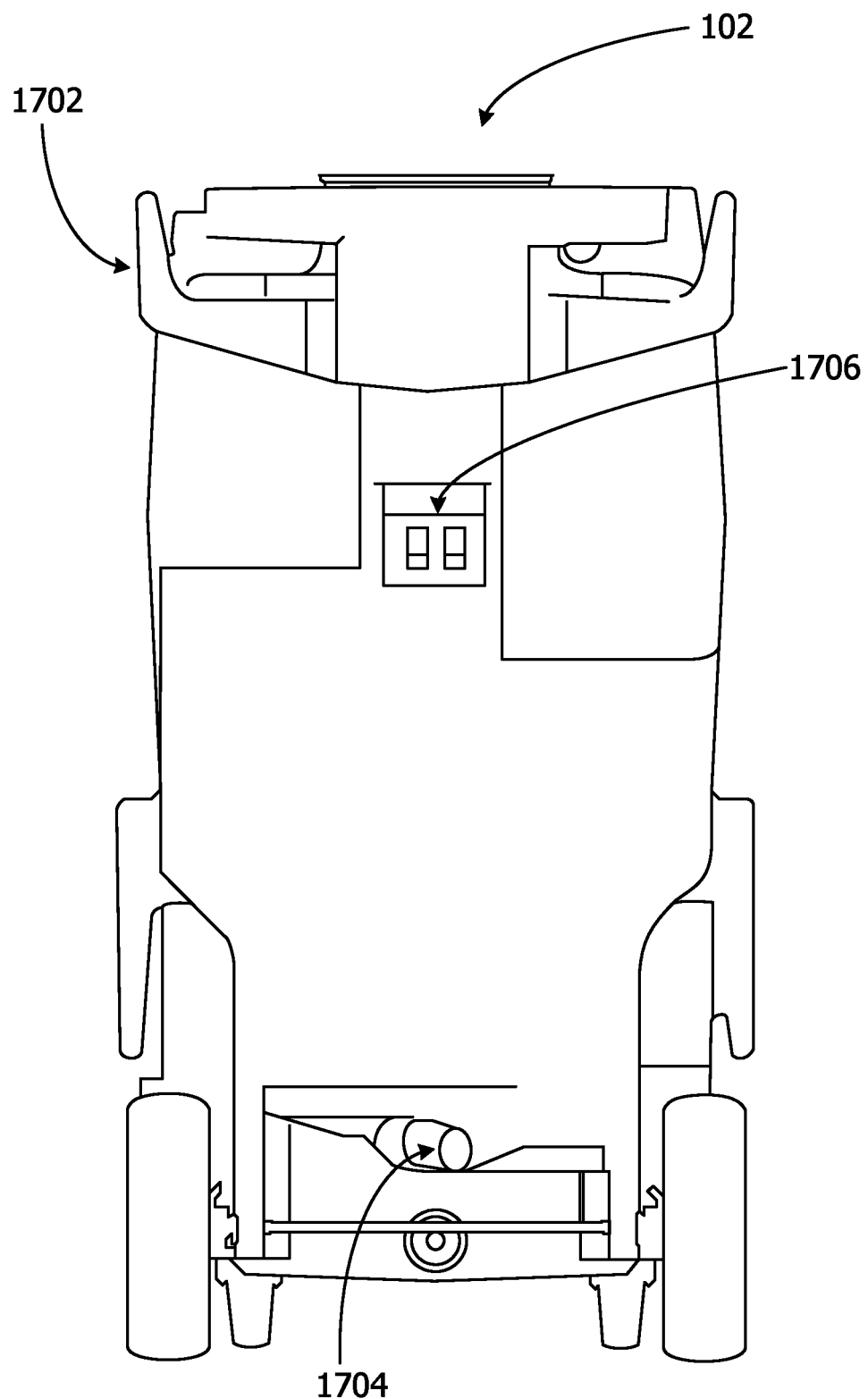
FIG. 17 is an exemplary rear view of the smart maintenance cart.

FIG. 17 is an exemplary rear view of the smart maintenance cart 102 having a handle 1702, at least one hose attachment 1704, and a set of controls 1706 for activating the vacuum and/or pump.

Figure 18:
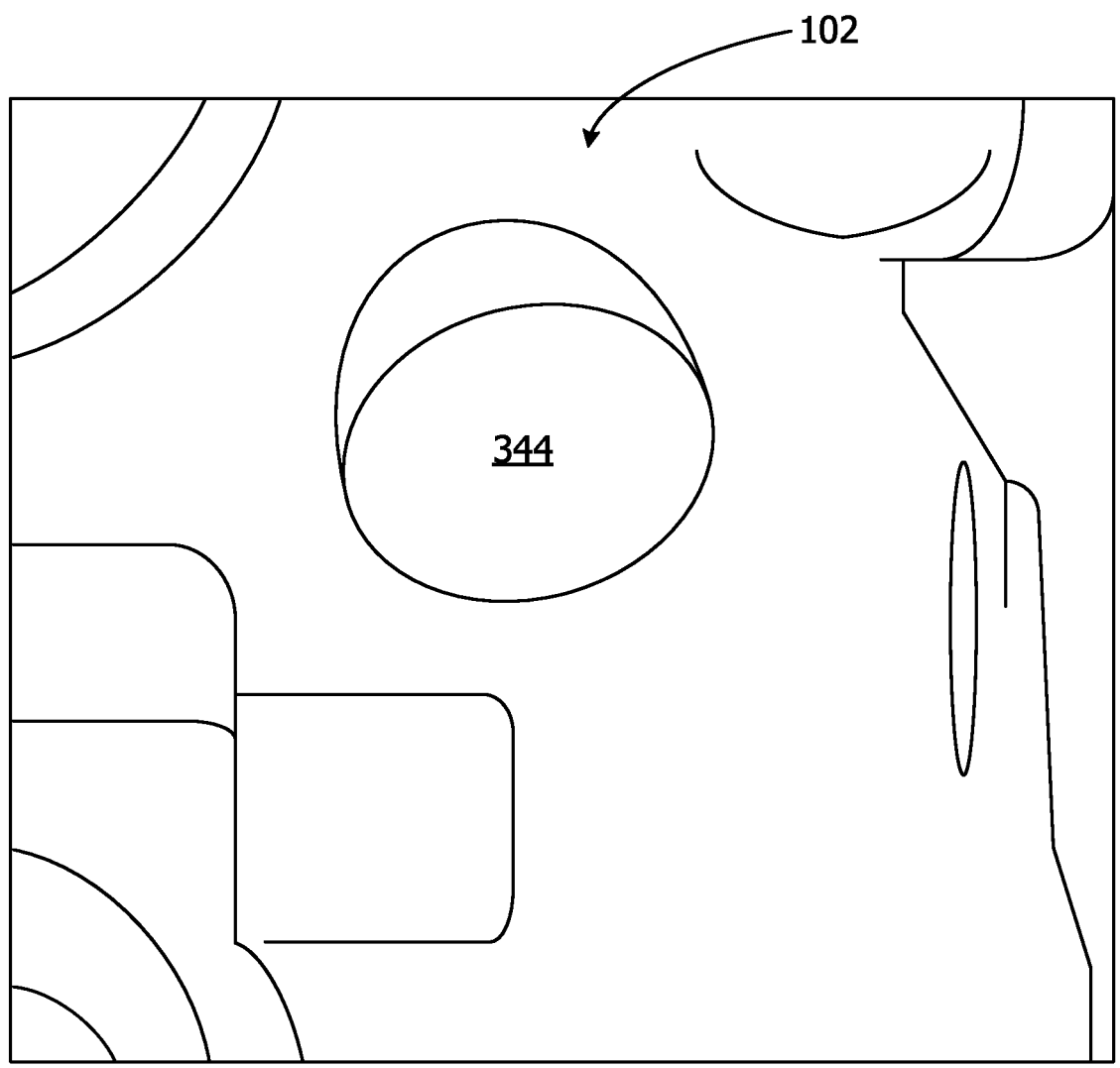
FIG. 18 is an exemplary top view of a spray bottle holder of the smart maintenance cart.

FIG. 18 is an exemplary top view of a spray bottle holder 344 of the smart maintenance cart 102. The spray bottle holder 344 has a diameter and depth sufficient to accommodate a portion of a spray bottle removably attached to the smart maintenance cart 102.

Figure 19:
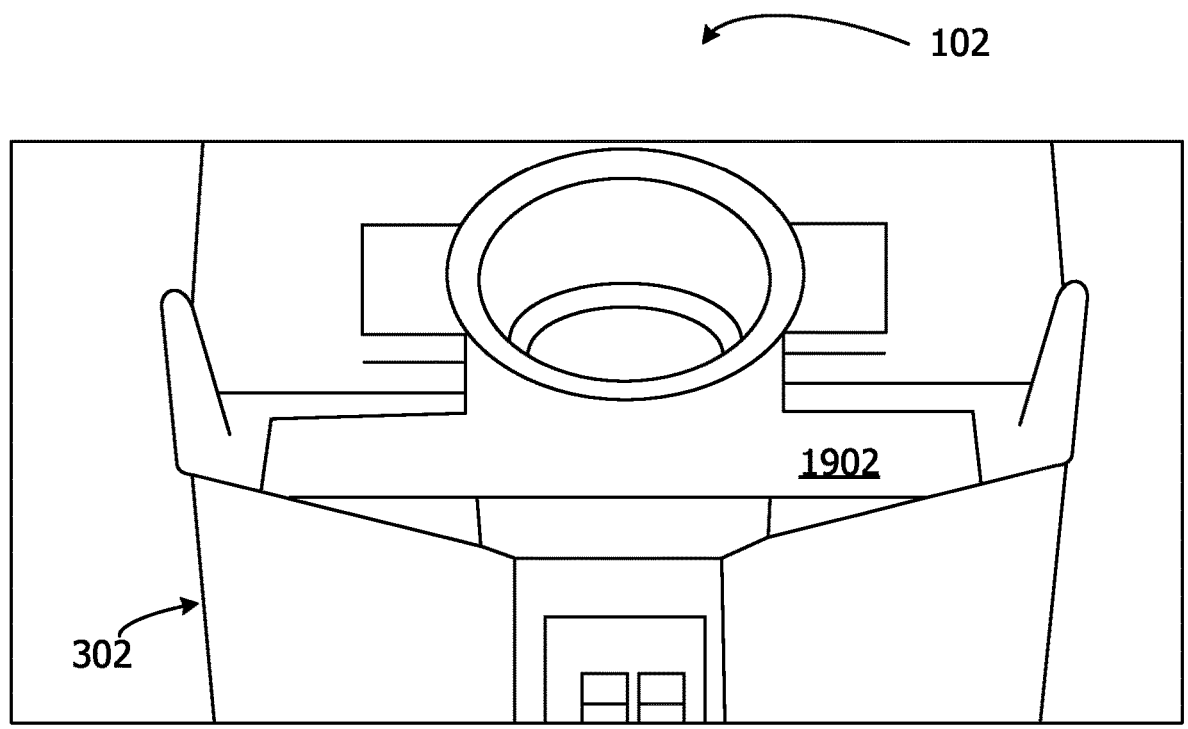
FIG. 19 is an exemplary top view of a hinged lid of the smart maintenance cart.

FIG. 19 is an exemplary top view of a hinged lid of the smart maintenance cart 102. The smart maintenance cart 102 in this non-limiting example includes a handle 1902 for opening a top portion of the main body 302 of the smart maintenance cart 102.

Figure 20:
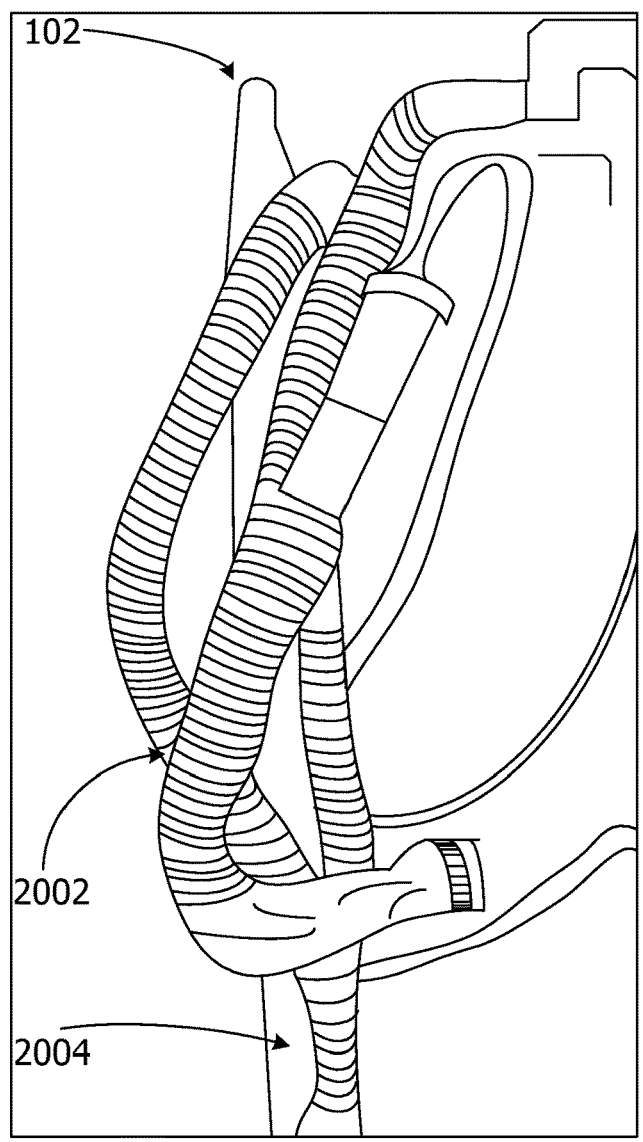
FIG. 20 is an exemplary side view of a set of hoses attached to the smart maintenance cart.

FIG. 20 is an exemplary side view of a smart maintenance cart 102 including a set of hoses 2002. The set of hoses 2002 in this example are wrapped around a hose spool 2004 for storage.

Figure 21:
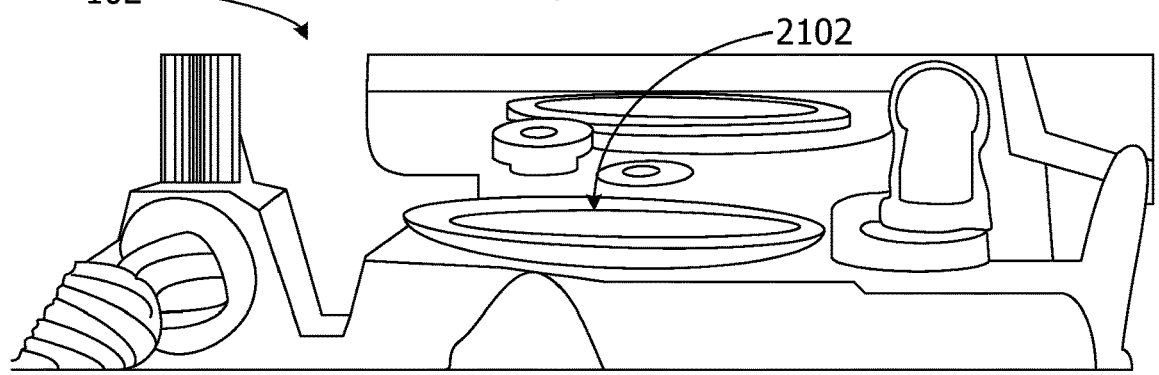
FIG. 21 is an exemplary front view of a trash catch attachment of the smart maintenance cart.

FIG. 21 is an exemplary front view of a smart maintenance cart 102 including a trash catch attachment 2102. The trash catch attachment 346 in some examples is removable.

Additional Examples

In some examples, cart triggers an un-scheduled cleaning (maintenance) of display cases based on a set of rules, including customized per-display case threshold performance metrics (temperature, run-time, water pressure, etc.) and prioritizing maintenance of cases based on which case has the poorest performance (highest priority). The system also identifies display cases requiring repair based on number of unscheduled cleanings within a time-period and performance data (sensor data) for each case.

In an example scenario, the system provides a cart for cleaning refrigerated item display cases. The cart includes a freshwater tank, a dirty water tank, a pump, a vacuum, and related hoses and nozzles. The cart includes a removably attached lift tool, an integrated strain/filter device, and an onboard interface for instructions and logging by a user. The cart further includes a barcode reader, a camera, a processor (on-board computer), a memory, and a transmission device, such as, but not limited to, a BLUETOOTH® or a communications interface component.

Display cases are identified by the cart via a case identifier. The case identifier can include a barcode, a QR code, a RFID tag, numeric identifier tag, etc. In one example, the display case has an identifier tag attached to a front member of the display case. The cart can also scan a user's identification to identify which user is performing the cleaning/maintenance task on a selected display case. The cart in this example stores data including which case is cleaned, who cleans the case, and when the case is cleaned.

In other examples, the cart includes electronic temperature sensors and monitors for tracking runtime (on/off time) of the temperature-controlled display case systems, such as the condenser, heating coils, or other temperature-regulation elements. When there are temperature issues, such as a display case failing to maintain a pre-programmed temperature range or running seventy-five percent (75%) of the time when it's designed to be running only fifty percent (50%) of the time, the smart cleaning case sends an alert to prompt a cleaning of the display case via a central database.

The display case in other examples communicates directly with the smart cleaning cart via Bluetooth, communications interface component, or another communications device. This eliminates the need for a central database/computer system. The smart display case is taken on regular rounds of the display cases, during which the smart cleaning cart scans each display case. The display case uploads the case refrigeration system historic information to the cart. Based on predetermined limits of high temperature/high running time, the cart can trigger a cleaning of the display case. The cart displays a notice on a user interface screen on the cart to the user that the current case is due for cleaning.

The system in other examples obtains performance/state data associated with power draw and head pressure associated with one or more temperature-controlled display cases, including a set of condensers, in a rack. A single rack is responsible for multiple evaporators. The data can indicate an issue with one or more of the condensers/evaporators. The smart cleaning cart logic determines whether a condition in the rack is problematic (high power, high head pressure). The cart queries one or more of the cases serviced by the problem rack to obtain performance data associated with each display case The system includes a prioritization component in some examples. The case having the worst performance is prioritized for cleaning/maintenance first. The remaining cases are cleaned/maintained in a worst-to-best succession, until the rack performance is back within acceptable limits. If the case (evaporator) cleaning is not sufficient, the cart system generates a repair alert indicating a potential mechanical fault or other problem with a condenser, compressor, or other part of the display case or rack.

In other examples, display cases include a data storage device storing performance data, historical maintenance data, maintenance schedules, etc. The smart cleaning cart retrieves this data from the display cases. The case-level data can be transferred to the cart wirelessly as the cart performs cleaning rounds of the display cases. Currently, when a system trips, a whole rack shuts down. By working data at the case level, the cart system identifies the evaporator in multiple cases that is performing below acceptable levels. Using case level data, the exact problem case is identified and cleaned, reducing work and improving overall case operational efficiency.

If the smart cleaning cart determines that an interval between cleaning/maintenance of a display case is too short (less than a threshold minimum time interval limit), the cart can identify the case as requiring repair or otherwise indicate a failing case evaporator or other mechanical fault associated with the display case. The threshold time interval limits indicate that a given case requires cleaning too frequently and flags the case for inspection, repair or replacement.

In another example scenario, the smart cleaning cart used to clean refrigerated cases consists of a freshwater tank that can be used to provide the washer fluid for performing a cleaning action and a dirty water tank to collect the dirty water post completing the cleaning operation. The cleaning cart further includes a pump, a vacuum, some hoses and some nozzles, for moving the cleaning liquid. The dimensions of the hoses and nozzles can be standardized. The cleaning device/cart also includes a device to lift a cover or lid covering the condensers, an integrated strainer and a filter device.

The cart in other examples uses pressurized water to clean surfaces associated with a refrigerated display case. The cart includes a vacuum for removing/taking up the dirty water during cleaning and/or after cleaning is complete. The water nozzle is sized large-enough to reduce water pressure to a threshold safe pressure-range which will prevent damage to heat exchanger (evaporator) coils.

The cart can include a lift tool removably attached to the cart. The lift tool holds up a fan plenum and allow the water stream from the water nozzle to reach the coil fins. The cart can likewise include a recess or compartment to hold/enclose or store the lift tool when not in use (cart in storage). In one example, the cart includes two lift tools. A fan plenum is supported by a fan lift tool on each side.

Other examples provide a removably attached water bottle. The water bottle can be attached via a cord, wire, string, or cable. The cart includes a cup holder or other recess in which the water bottle is placed/rests when not in use.

A drain filter feature is included on the cart in other examples. This feature has a bottom mounted drain feature makes draining the dirty water simpler. The dirty water tank can include a filter to catch larger items, such as labels, paper, or other debris. The filter prevents debris from clogging the water tank drain and/or the water drain hose.

The filter, in one example, is implemented as a bucket with holes. As dirty water is poured through the bucket, the holes catch the debris while allowing water to pass through and down the drain. This filter can be incorporated into the dirty water holding tank or could be fitted to the hose end. Incorporating it into the tank would be similar in configuration to a kitchen steamer pot. Incorporating it into the hose end includes a filter piece that attaches to one end of a drain hose or drain opening, but is totally closed off, except for several holes small enough to trap problematic debris. The filter holes are numerous enough to allow water to flow through the device.

In another example, the smart maintenance cart includes a universal fill hose connected to a water tank and retractable into the water tank. The cart can also include an aluminum vacuum wand for vacuuming up dirty water and other debris. The vacuum wand connects to a hose which delivers the dirty water into a dirty water tank. The cart can also include a squeegee head for cleaning surfaces.

The smart cleaning cart system in another example aggregates sensor data, including temperature data, from a plurality of refrigerated display cases. The cart obtains sensor data from each refrigerated display case and analyses the sensor data to detect display cases operating below an acceptable threshold/due for maintenance (unscheduled cleaning). The cart communicates with each refrigeration unit to retrieve temperature and runtime performance data to identify which display case requires unscheduled cleaning.

In one example, a user enters a display case identifier (number) identifying the display case due to be cleaned, currently being cleaned, or the display case which has successfully been cleaned (cleaning complete). The smart cleaning cart schedules cleaning of display cases based on historical cleaning data (when last cleaning was performed).

In other examples, a display case sends an alert/alarm to the smart cleaning cart if the temperature or operational performance of the refrigerated display falls below a minimum acceptable threshold level. The alarm/alert triggers a notification to a user to clean the display case. If an alarm goes off on same case multiple times (multiple unscheduled cleanings) within a threshold time-period, the smart cleaning cart triggers a maintenance/repair notification indicating a potential mechanical problem with the display case.

The smart cleaning cart generates customized cleaning schedules for each refrigerated case based on an analysis of the sensor data using criteria/rules customized for the items in the display case. In other words, one set of criteria are applied if the display case contains milk and a different set of criteria are applied if the display case contains frozen vegetables. The criteria include a threshold temperature, threshold run time, per-case cleaning frequency, and/or cleaning schedule.

The smart cleaning cart system identifies refrigerated cases requiring action and determines whether the required action is an unscheduled cleaning or a repair (mechanical problems) based on historical cleaning data for each refrigerated case and the current/real-time sensor data, such as performance data (runtime, internal temperature, etc.). In an exemplary scenario, a user removes the shelves from a set of refrigerated displays and lifts a fan member using a set of fan lift tools. Under the fan member is a set of evaporator coils/heat exchangers. The fan lift tool is utilized to hold up the fan member while the coil(s) underneath the fan member are cleaned.

The coils are made of a metallic conductor including refrigerant inside the coils. As air moves across the coils, the air is cooled. Dust, dirt or debris on the coils interferes with heat exchange because dust is an insulator. As dust and dirt accumulates on the coils, it reduces the evaporators ability to transfer heat. If the coils are dirty, the system runs longer to cool the same amount of space and/or loses its ability to cool the space. The user utilizes the cleaning cart to clean/perform routine maintenance on the refrigerated display.

A machine learning component on the smart cleaning cart in one example updates the customized criteria/rules and/or updates cleaning schedules for refrigerated cases in real-time based on maintenance and repair feedback received from users and/or updated sensor data received from the display cases. The machine learning component analyses the cleaning frequency for each display case with item data to optimize the cleaning schedule for each display case. Thus, each display case has a different cleaning schedule, different set of acceptable performance thresholds, different temperature ranges, and different maintenance frequencies based on the locations of the display cases, the age of the display cases, and the types of items stored within the display cases. For example, a refrigerated display case storing meat may require more frequent cleaning than a case storing frozen vegetables.

In still other examples, the cleaning device/cart is equipped with a user interface for enabling a user to log-in to the system and record the cleaning operations that have been performed. The smart maintenance cart maintains a record of which display cases were cleaned and when each display case was cleaned. The smart maintenance cart can include an automated display schedule. The smart maintenance cart and/or a central computing device communicates with a user via a user interface or a user computing device to notify the user as to which display case to clean next.

Further, the smart cleaning cart can maintain a communication with remote server/senders regarding the refrigerated cases due to be cleaned, information associated with refrigerated cases to be cleaned, and a request to the user to perform the cleaning of the identified refrigerated case. A remote computing device can optionally send instructions to the cleaning cart for cleaning a surface associated with the refrigerated case(s). The refrigerated case in this example includes a temperature sensor for detecting temperature changes in the case and a timer for tracking the running time of the refrigerated case. These data points will be used to communicate to the cleaning cart and a request to perform the cleaning operation.

The user interface on the cart in one example includes a touchscreen. The user interface outputs instructions to one or more users. The user interface permits the user to enter maintenance tasks performed, identify display cases cleaned, log-into the system, record a log on-board the cart, etc. Visual aids, such as graphics, icons, text, and/or color coding can be output via the user interface to assist the user to aid in setup, as well as for setup and maintenance. For example, the user interface can output a reminder or suggestions to clean a display case, replace a pump, etc.

In other examples, each display case includes an identifier, such as an RFID tag or a Digi-mark reader, attached to the cart. After cleaning an evaporator and resetting the display case (modular display), the user scans the location identifier on the display case to capture display case data associated with any display case identifiers. That data is then fed to a central database. The system can query the database for outs, proper placement, and other data associated with the proper display of the modular display. In these examples, scanning the display case identifier is the last step of cleaning.

Alternatively, or in addition to the other examples described herein, examples include any combination of the following:

the analysis component, implemented on the at least one processor, that identifies the at least one display case in the plurality of temperature-controlled display cases having a heat exchange performance outside a per-case acceptable performance threshold range based on an analysis of the sensor data, including heat exchange performance data, obtained from the plurality of sensor devices or a set of sensor devices;

wherein the set of sensor devices associated with the plurality of temperature-controlled display cases further comprises at least one pressure sensor;

the analysis component, implemented on the at least one processor, that identifies the at least one display case in the plurality of temperature-controlled display cases having a head pressure outside a per-case acceptable pressure threshold range based on an analysis of the sensor data, including head pressure data, obtained from the plurality of sensor devices;

wherein the set of sensor devices associated with the plurality of temperature-controlled display cases further comprises at least one power utilization sensor;

the analysis component, implemented on the at least one processor, that identifies the at least one display case in the plurality of temperature-controlled display cases having a power utilization outside a per-case acceptable power draw threshold range based on an analysis of the sensor data, including power utilization data, obtained from the set of sensor devices;

wherein the set of sensor devices further comprises a set of image capture devices coupled to the smart maintenance cart;

an image recognition component, implemented on the at least one processor, that analyzes image data associated with at least a portion of the at least one display case generated by the set of image capture devices to verify a completed maintenance task;

a scan device associated with a user, wherein the scan device generates scan data associated with a barcode on at least one temperature-controlled display case in the plurality of temperature-controlled display cases and transmits the scan data to a maintenance controller on the smart maintenance cart;

the smart maintenance controller, implemented on the at least one processor, that filters the scan data with display case data to identify the at least one display case and retrieve a maintenance history associated with the at least one display case, the maintenance history including a date of previous maintenance activity associated with the at least one display case within the predetermined time-period;

a prioritization component, implemented on the at least one processor, that generates a set of priority rankings including a ranking for each case in the plurality of temperature-controlled display cases based on the sensor data and a result of the analysis;

a dynamic scheduling component, implemented on the at least one processor, that identifies a highest priority case in the set of temperature-controlled display for cleaning based on the set of priority rankings;

the scheduling component, implemented on the at least one processor, that analyzes the maintenance schedule data associated with the at least one display case to identify the number of maintenance tasks performed on the at least one display case within a threshold time-period;

the unscheduled maintenance component, implemented on the at least one processor, that triggers an unscheduled maintenance task associated with the at least one display case on condition the number of maintenance tasks is within a threshold maintenance task range for the time-period;

the inspection maintenance component, implemented on the at least one processor, that triggers a repair inspection on condition the number of maintenance tasks is outside the threshold range;

a machine learning component, implemented on the at least one processor, that analyzes unscheduled maintenance and repair data associated with the plurality of temperature-controlled display cases using pattern analysis and generates a per-case updated maintenance schedule for at the at least one display case based on the analysis;

a set of one or more fan housing lift tools associated with the maintenance cart for lifting a fan housing during cleaning of the at least one display case;

a machine learning component, implemented on the at least one processor, that analyzes unscheduled maintenance and repair data associated with the plurality of temperature-controlled display cases using pattern analysis and generates a per-case updated maintenance schedule for at the at least one display case based on the analysis;

a data storage device storing maintenance schedule data and maintenance history data associated with a plurality of temperature-controlled display cases, wherein the smart maintenance controller updates the maintenance history data in response to receiving user input indicating completion of a maintenance task associated with the highest priority case;

a user interface component, wherein the maintenance task notification is output to the user via the user interface component;

a transmitter device, wherein the transmitter device sends the maintenance task notification to a user device associated with the user via a network;

analyzing, by the cart controller component, maintenance schedule data associated with the at least one display case to identify an elapsed time since a previous maintenance task associated with the at least one display case;

triggering, by an unscheduled maintenance component, an unscheduled maintenance task associated with the at least one display case on condition the elapsed time is within a threshold time-period;

triggering, by an inspection component, a repair inspection on condition the elapsed times is outside a threshold time-period;

analyzing, by the scheduling component, the maintenance schedule data associated with the at least one display case to identify the number of maintenance tasks performed on the at least one display case within a threshold time-period;

triggering, an unscheduled maintenance component, an unscheduled maintenance task associated with the at least one display case on condition the number of maintenance tasks is within a threshold maintenance task range for the time-period;

triggering, by an inspection maintenance component a repair inspection on condition the number of maintenance tasks is outside the threshold range;

updating a maintenance history record on a data storage device associated with the smart maintenance cart upon completion of a maintenance task;

wherein the set of performance metric value comprises an internal temperature value, a head pressure value, a power utilization value, and a heat exchange value, wherein the set of per-case acceptable threshold values comprises an acceptable temperature threshold range, an acceptable pressure threshold range, an acceptable power draw threshold range, and a heat exchange threshold rate.

At least a portion of the functionality of the various elements in FIG. 1, FIG. 2, FIG. 3, FIG. 4, FIG. 5, FIG. 6, FIG. 7, FIG. 8, FIG. 14, FIG. 15, FIG. 16, FIG. 17, FIG. 18, FIG. 19, FIG. 20, and FIG. 21 can be performed by other elements in FIG. 1, FIG. 2, FIG. 3, FIG. 4, FIG. 5, FIG. 6, FIG. 7, FIG. 8, FIG. 14, FIG. 15, FIG. 16, FIG. 17, FIG. 18, FIG. 19, FIG. 20, and FIG. 21, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 14, FIG. 15, FIG. 16, FIG. 17, FIG. 18, FIG. 19, FIG. 20, and FIG. 21.

In some examples, the operations illustrated in FIG. 11, FIG. 12 and FIG. 13 are implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations suitable for use with aspects of the disclosure include, but are not limited to, mobile computing devices, personal computers, server computers, handheld or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for smart temperature-controlled display case maintenance associated with a smart maintenance cart. For example, the elements illustrated in FIG. 1, FIG. 2, FIG. 3, FIG. 4, FIG. 5, FIG. 6, FIG. 7, FIG. 8, FIG. 14, FIG. 15, FIG. 16, FIG. 17, FIG. 18, FIG. 19, FIG. 20, and FIG. 21, such as when encoded to perform the operations illustrated in FIG. 11, FIG. 12 and FIG. 13, constitute exemplary means for analyzing the sensor data using a set of per-case performance thresholds; exemplary means for generating a set of priority rankings including a ranking for each display case in the set of temperature-controlled display cases based on a result of the analysis; exemplary means for identifying a highest priority case in the set of temperature-controlled display cases for maintenance based on the set of priority rankings; and exemplary means for outputting a maintenance task notification to a user, the maintenance task notification comprising a case identifier associated with the highest priority case for cleaning.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for dynamic temperature-controlled display case maintenance, the system comprising:
 a data storage device storing maintenance schedule data associated with a plurality of temperature-controlled display cases;
 a smart maintenance cart, the smart maintenance cart comprising a main body housing at least one of a hose, a tank, a vacuum, a vacuum hose, a stop track cleaner, a pump, or a drain hose filter, a memory including the data storage device, and at least one processor communicatively coupled to the memory;
 a communications interface component, implemented on the at least one processor, obtaining sensor data from a set of sensor devices via a network, the set of sensor devices associated with one or more condensers of the plurality of temperature-controlled display cases, the set of sensor devices including at least one of a heat exchange performance sensor and a pressure sensor;
 an analysis component, implemented on the at least one processor, that identifies at least one display case in the plurality of temperature-controlled display cases having an operational level outside a per-case acceptable threshold operational range based on an analysis of the sensor data;
 a scheduling component, implemented on the at least one processor, that analyzes the maintenance schedule data to identify an elapsed time since a previous maintenance task associated with the identified at least one display case and triggers an unscheduled maintenance task associated with the identified at least one display case on condition the elapsed time is within a threshold time-period; and
a prioritization component, implemented on the at least one processor, that generates a set of priority rankings including a ranking for each case in the plurality of temperature-controlled display cases based on the obtained sensor data and a result of the analysis; and
the scheduling component, implemented on the at least one processor, that identifies a highest priority condenser associated with the plurality of temperature-controlled display for cleaning based on the set of priority rankings.

2. The system of claim 1, wherein the set of sensor devices further comprises at least one power utilization sensor, and further comprising:
the analysis component, implemented on the at least one processor, that identifies the at least one display case in the plurality of temperature-controlled display cases having a power utilization outside a per-case acceptable power draw threshold range based on an analysis of the sensor data, including power utilization data, obtained from the set of sensor data.

3. The system of claim 1, wherein the smart maintenance cart further comprises:
a set of image capture devices coupled to the smart maintenance cart; and
an image recognition component, implemented on the at least one processor, that analyzes image data generated by the set of image capture devices to verify a completed maintenance task.

4. The system of claim 1, further comprising:
a maintenance controller, implemented on the at least one processor, that receives scan data from a scan device, the scan data corresponding to a barcode associated with at least one temperature-controlled display case and filters the scan data with display case data to identify the at least one temperature-controlled display case and retrieve a maintenance history associated with the at least one temperature-controlled display case, the maintenance history including a date of previous maintenance activity associated with the at least one temperature-controlled display case within a predetermined time-period.

5. The system of claim 1, further comprising:
an inspection component, implemented on the at least one processor, that triggers a repair inspection on condition the elapsed times is outside the threshold time-period.

6. The system of claim 1, further comprising:
the scheduling component, implemented on the at least one processor, that analyzes the maintenance schedule data associated with the at least one display case to identify a number of maintenance tasks performed on the at least one display case within the threshold time-period;
the scheduling component, implemented on the at least one processor, that triggers the unscheduled maintenance task associated with the at least one display case on condition the number of maintenance tasks is within a threshold maintenance task range for the time-period; and
an inspection maintenance component, implemented on the at least one processor, that triggers a repair inspection on condition the number of maintenance tasks is outside the threshold maintenance task range.

7. The system of claim 1, further comprising:
a machine learning component, implemented on the at least one processor, that analyzes unscheduled maintenance and repair data associated with the plurality of temperature-controlled display cases using pattern analysis and generates a per-case updated maintenance schedule for at the at least one display case based on the analysis.

8. A maintenance cart for cleaning temperature-controlled display cases, the maintenance cart comprising:
a main body comprising a set of water tanks, a pump, a vacuum, a set of hoses, a drain hose filter, and a set of rollers attached to a bottom surface of the main body;
a memory;
at least one processor communicatively coupled to the memory; and
a smart maintenance controller, implemented on the at least one processor, that:
receives sensor data from a set of sensor devices via a network, the set of sensor devices associated with one or more condensers of the temperature-controlled display cases, the set of sensor devices including at least one of a heat exchange performance sensor and a pressure sensor;
analyzes the sensor data using a set of per-case performance thresholds;
generates a set of priority rankings including a ranking for each display case in the temperature-controlled display cases based on a result of the analysis;
identifies a highest priority condenser associated with the temperature-controlled display cases for maintenance based on the set of priority rankings; and
outputs a maintenance task notification, the maintenance task notification comprising a case identifier associated with the highest priority condenser for cleaning.

9. The maintenance cart of claim 8, further comprising:
a fan housing lift tool associated with the maintenance cart for lifting a fan housing during cleaning of the highest priority condenser.

10. The maintenance cart of claim 8, further comprising:
a machine learning component, implemented on the at least one processor, that analyzes unscheduled maintenance and repair data associated with the temperature-controlled display cases using pattern analysis and generates a per-case updated maintenance schedule for at least one display case based on the analysis.

11. The maintenance cart of claim 8, further comprising:
a data storage device storing maintenance schedule data and maintenance history data associated with a plurality of temperature-controlled display cases, wherein the smart maintenance controller updates the maintenance history data in response to receiving user input indicating completion of a maintenance task associated with the highest priority case.

12. The maintenance cart of claim 8, further comprising:
a user interface component, wherein the maintenance task notification is output via the user interface component.

13. The maintenance cart of claim 8, further comprising:
a transmitter device, wherein the transmitter device sends the maintenance task notification to a user device via a network.

14. A computer-implemented method for customizing temperature-controlled display case cleaning via a smart maintenance cart, the computer-implemented method comprising:
obtaining, by the smart maintenance cart, sensor data from a set of sensor devices associated with one or more condensers of a plurality of temperature-controlled display cases via a network, the sensor data including performance data associated with each display case in the plurality of cases, the set of sensor devices including at least one of a heat exchange performance sensor and a pressure sensor;

identifying, by the smart maintenance cart, a set of display cases in the plurality of temperature-controlled display cases having a set of performance metric values outside a set of per-case acceptable threshold value ranges based on analysis of the sensor data;

generating, by the smart maintenance cart, a set of priority ranking including a priority ranking for each display case in the plurality of temperature-controlled display cases based on a result of the analysis and a predetermined maintenance schedule for the plurality of temperature-controlled display cases;

identifying, by the smart maintenance cart, a highest priority case in the plurality of temperature-controlled display cases for cleaning based on the set of priority rankings; and outputting, by a transmitter device associated with the smart maintenance cart, a maintenance task notification to a user device, the maintenance task notification comprising a case identifier associated with the highest priority case for cleaning.

15. The computer-implemented method of claim 14, further comprising:

analyzing, by a cart controller component, maintenance schedule data associated with at least one display case to identify an elapsed time since a previous maintenance task associated with the at least one display case;

triggering, by a scheduling component, an unscheduled maintenance task associated with at least one display case on condition the elapsed time is within a threshold time-period; and triggering, by an inspection component, a repair inspection on condition the elapsed times is outside the threshold time-period.

16. The computer-implemented method of claim 14, further comprising:

analyzing, by a scheduling component, maintenance schedule data associated with at least one display case to identify a number of maintenance tasks performed on the at least one display case within a threshold time-period;

triggering, by the scheduling component, an unscheduled maintenance task associated with the at least one display case on condition the number of maintenance tasks is within a threshold maintenance task range for a time-period; and triggering, by an inspection maintenance component a repair inspection on condition the number of maintenance tasks is outside the threshold maintenance task range.

17. The computer-implemented method of claim 14, further comprising:

updating a maintenance history record on a data storage device associated with the smart maintenance cart upon completion of a maintenance task.

18. The computer-implemented method of claim 14, wherein the set of performance metric value comprises an internal temperature value, a head pressure value, a power utilization value, and a heat exchange performance value, wherein the set of per-case acceptable threshold values comprises an acceptable temperature threshold range, an acceptable pressure threshold range, an acceptable power draw threshold range, and a heat exchange threshold rate.

* * * * *